(12) United States Patent
Shi et al.

(10) Patent No.: US 11,181,683 B2
(45) Date of Patent: Nov. 23, 2021

(54) BACKLIGHT MODULE, DISPLAY DEVICE AND ASSEMBLING METHOD THEREOF

(71) Applicants: BEIJING BOE DISPLAY TECHNOLOGY CO., LTD., Beijing (CN); BOE TECHNOLOGY GROUP CO., LTD., Beijing (CN)

(72) Inventors: Yang Shi, Beijing (CN); Xiang Li, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/814,198

(22) Filed: Mar. 10, 2020

(65) Prior Publication Data

US 2021/0026058 A1    Jan. 28, 2021

(30) Foreign Application Priority Data

Jul. 26, 2019 (CN) .......................... 201910682070.2

(51) Int. Cl.
*G02F 1/1333* (2006.01)
*F21V 8/00* (2006.01)
*G02F 1/13357* (2006.01)

(52) U.S. Cl.
CPC ........... *G02B 6/009* (2013.01); *G02B 6/0065* (2013.01); *G02B 6/0078* (2013.01); *G02F 1/133317* (2021.01); *G02F 1/133608* (2013.01)

(58) Field of Classification Search
CPC .................... G02F 1/133608; G02F 1/133317
See application file for complete search history.

(56) References Cited

U.S. PATENT DOCUMENTS

2017/0038515 A1 *   2/2017   Yuki ................... G02B 6/0038

FOREIGN PATENT DOCUMENTS

CN                  205356544 U        6/2016

* cited by examiner

*Primary Examiner* — Sean P Gramling
(74) *Attorney, Agent, or Firm* — Westman, Champlin & Koehler, P.A.

(57) ABSTRACT

A backlight module, a display device and an assembling method of a display device are provided. The backlight module includes: a backlight assembly including a back plate and a first transitional frame, wherein the back plate is fixedly connected with the first transitional frame, a light guide plate is provided on the back plate, the light guide plate and the first transitional frame are respectively located on opposite sides of the back plate in a thickness direction of the backlight module; and an outer frame, wherein the outer frame and the light guide plate are provided on the same side of the back plate in the thickness direction of the backlight module, and the outer frame is fixedly connected with the first transitional frame so that the outer frame is fixedly connected with the back plate through the first transitional frame.

16 Claims, 16 Drawing Sheets

BACKLIGHT MODULE, DISPLAY DEVICE AND ASSEMBLING METHOD THEREOF

CROSS-REFERENCE TO RELATED APPLICATION

This application claims the benefit of Chinese Patent Application No. 201910682070.2 filed on Jul. 26, 2019 in the State Intellectual Property Office of China, the whole disclosure of which is incorporated herein by reference.

TECHNICAL FIELD

The present disclosure relates to the field of display technology, and in particular, to a backlight module, a display device and an assembling method of a display device.

BACKGROUND

With the continuous increase of user's demand for electronic products, a touch-integrated television has become one of indispensable electrical appliances in daily life, and it is more and more widely used in various scenarios.

However, in the related art, display products such as touch display devices require a large number of parts and complicated structures, resulting in complicated and time-consuming manufacturing processes. Moreover, it is difficult to control appearance defects of the display products, so that there is a high risk to manufacture some products having the appearance defects. As a result, the product manufacturing efficiency is low, the cost of a single product is high, and a price of the product is high.

SUMMARY

In an aspect, it is provided a backlight module, wherein the backlight module includes: a backlight assembly including a back plate and a first transitional frame, wherein the back plate is fixedly connected with the first transitional frame, a light guide plate is provided on the back plate, the light guide plate and the first transitional frame are respectively located on opposite sides of the back plate in a thickness direction of the backlight module; and an outer frame, wherein the outer frame and the light guide plate are provided on the same side of the back plate in the thickness direction of the backlight module, and the outer frame is fixedly connected with the first transitional frame so that the outer frame is fixedly connected with the back plate through the first transitional frame.

According to some exemplary embodiments, the outer frame includes a first surface frame located above the back plate and a first side frame located at a side of the first surface frame and surrounding the back plate; and the first transitional frame includes a second surface frame and a second side frame located at a side of the second surface frame, the first side frame includes a first extension extending toward the back plate and surrounding the second side frame, and the first extension is connected with the second side frame.

According to some exemplary embodiments, the backlight module further includes a first sideward lock member, wherein the first extension and the second side frame are fixedly connected by the first sideward lock member.

According to some exemplary embodiments, the first sideward lock member is a sideward lock screw, a first through hole is formed in the first extension, a first threaded connection hole is formed in the second side frame, and the sideward lock screw passes through the first through hole and is screwed into the first threaded connection hole.

According to some exemplary embodiments, the second side frame extends from an outer edge of the second surface frame toward the outer frame, so that the second side frame and the second surface frame collectively define a bearing groove having an accommodation space; and the back plate includes an edge portion and a flange portion provided on an edge of the edge portion and extending toward the first surface frame, and both the edge portion and the flange portion are installed in the bearing groove.

According to some exemplary embodiments, the backlight module further includes a first back lock member, wherein the second surface frame and the edge portion are fixedly connected by the first back lock member.

According to some exemplary embodiments, the first back lock member is a first back lock screw, a second through hole is formed in the second surface frame, a second threaded connection hole is formed in the edge portion, and the first back lock screw passes through the second through hole and is screwed into the second threaded connection hole.

According to some exemplary embodiments, the first surface frame includes a first limiting portion extending away from the first side frame and extending above the back plate; and a backlight film is disposed on the back plate, and an edge of the backlight film is sandwiched between the first limiting portion and the back plate.

According to some exemplary embodiments, a protrusion for positioning is formed on the edge portion, the protrusion is fixedly connected with the back plate and is spaced apart from the flange portion, and a backlight film is disposed on the back plate, the backlight film includes a positioning hole that is positionally fitted with the protrusion, and the light guide plate includes a positioning groove that is positionally fitted with the protrusion.

According to some exemplary embodiments, the backlight assembly further includes: a second transitional frame, the second transitional frame and the outer frame are located on the same side of the back plate in the thickness direction of the backlight module.

According to some exemplary embodiments, the backlight assembly includes three first transitional frames and one second transitional frame, the back plate includes four flange portions surrounding the edge portion, the second transitional frame is disposed correspondingly to one of the flange portions, and the first transitional frames are disposed correspondingly to the other three flange portions, respectively.

According to some exemplary embodiments, the second transitional frame includes a first connection portion, a second connection portion and a second limiting portion, both the first connection portion and the second limiting portion are located on an inner side of the corresponding flange portion, the second limiting portion extends above the backlight film, and the second connection portion is located on an outer side of the corresponding flange portion.

According to some exemplary embodiments, the backlight assembly further includes a second sideward lock member, wherein, the first side frame includes a third extension extending toward the back plate and surrounding the second connection portion, a third through hole is formed in the third extension, a third threaded connection hole is formed in the second connection portion, and the second sideward lock member passes through the third through hole and is screwed into the third threaded connection hole.

According to some exemplary embodiments, the backlight assembly further includes a top lock member, and the top lock member locks the first connection portion and the back plate from a top side of the second transitional frame; and the top lock member is a top lock screw, a fourth through hole is formed in the first connection portion, a fourth threaded connection hole is formed in the back plate, and the top lock screw passes through the fourth through hole and is screwed into the fourth threaded connection hole.

According to some exemplary embodiments, the backlight assembly further includes: a second back lock member, the second side frame and the first surface frame are fixedly connected by the second back lock member.

According to some exemplary embodiments, the second back lock member is a second back lock screw, a fifth through hole is formed in the second side frame, a fifth threaded connection hole is formed in the first surface frame, and the second back lock screw passes through the fifth through hole and is screwed into the fifth threaded connection hole.

In another aspect, it is provided a display device including: a display screen; and the backlight module as described above, wherein, the outer frame includes a first surface frame located above the back plate and a first side frame located at a side of the first surface frame and surrounding the back plate, and the display screen is installed on the first surface frame of the outer frame.

According to some exemplary embodiments, the outer frame further includes a second extension extending toward the display screen, and the display screen is received in a receiving space which is defined collectively by the first surface frame and the second extension.

In a further aspect, it is provided a method for manufacturing a display device, including: assembling a display screen and an outer frame to form a display screen assembly; assembling a back plate and a transitional frame; installing a reflective sheet, a light guide plate and a backlight film on the back plate in sequence to form a backlight assembly; and placing the display screen assembly on the backlight assembly, and connecting fixedly the outer frame with the transitional frame by a sideward lock member to form the display device, wherein, the transitional frame includes a first transitional frame, the light guide plate and the first transitional frame are respectively located on opposite sides of the back plate in a thickness direction of the display device, and the light guide plate and the outer frame are located on the same side of the back plate in the thickness direction of the display device; the assembling the back plate and the transitional frame includes: connecting fixedly the first transitional frame with the back plate by a first back lock member; and the connecting fixedly the outer frame with the transitional frame by the sideward lock member includes: locking the outer frame with the first transitional frame by a first sideward lock member from a radial outer side of the backlight assembly.

According to some exemplary embodiments, the transitional frame further includes a second transitional frame, and the second transitional frame and the outer frame are located on the same side of the back plate in the thickness direction of the display device; the assembling the back plate and the transitional frame further includes: connecting fixedly the second transitional frame with the back plate by a top lock member; and the connecting fixedly the outer frame with the transitional frame by the sideward lock member further includes: locking the outer frame with the second transitional frame by a second sideward lock member from the radial outer side of the backlight assembly.

DETAILED DESCRIPTION OF EMBODIMENTS

Figure 1:
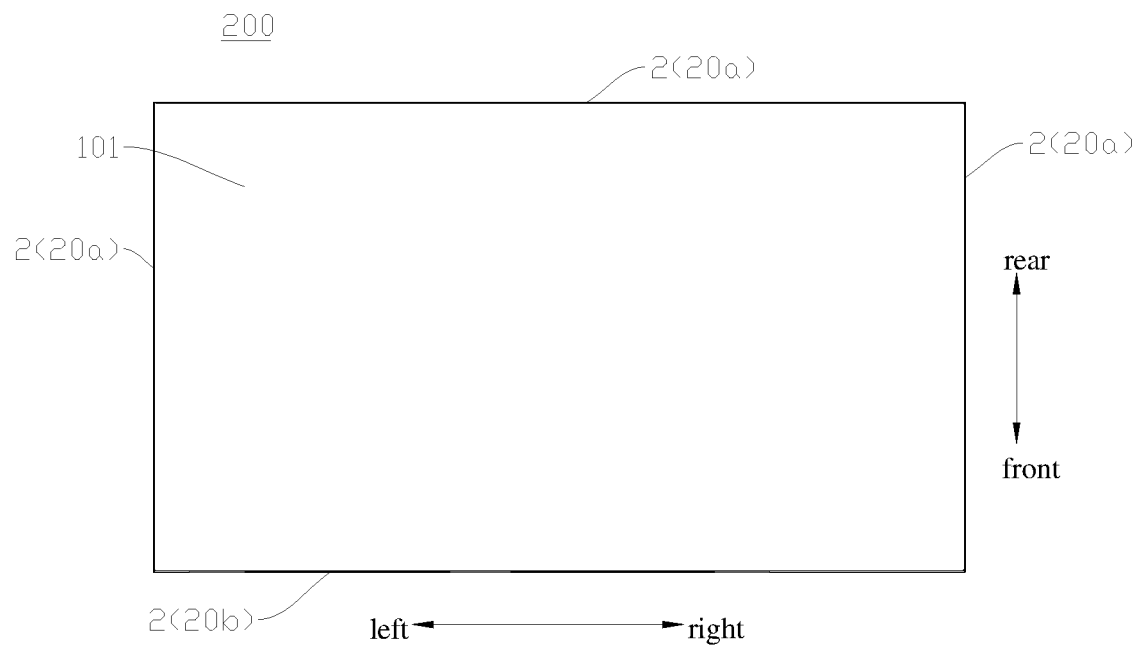
FIG. 1 is a schematic structural view of a display device according to some embodiments of the present disclosure.

Embodiments of the present disclosure will be described in detail below. Examples of the embodiments are shown in accompanying drawings, wherein the same or similar reference numerals represent the same or similar elements or elements having the same or similar functions throughout the specification. The embodiments described below with reference to the drawings are exemplary, and are intended to explain the present disclosure, and should not be construed as limiting the present disclosure.

Several different embodiments or examples will be provided below to implement different structures of the present disclosure. To simplify the disclosure of the present disclosure, components and settings of specific examples will be described below. Of course, they are merely exemplary and are not intended to limit the present disclosure. Furthermore, for the sake of simplicity and clarity, reference numbers and/or words may be repeated in different examples of the present disclosure, and such a repetition does not indicate any relationship between various embodiments and/or settings discussed below. In addition, examples of various specific processes and materials may be provided in the present disclosure, but those skilled in the art may understand that other processes and/or other materials are applicable in the present disclosure.

A backlight module 100 according to some embodiments of the present disclosure will be described below with reference to FIGS. 1 to 16.

As shown in FIGS. 1-4, the backlight module 100 includes a backlight assembly 1 and an outer frame 2. The backlight assembly 1 includes a back plate 11 and a first transitional frame 12. The back plate 11 and the first transitional frame 12 are fixedly connected. A light guide plate 14 is provided on the back plate 11, and the light guide plate 14 and the first transitional frame 11 are respectively located on opposite sides of the back plate 11, thereby saving an installation space on a side of the back plate 11 where the light guide plate 14 is located. In this way, it may facilitate installing other components on the back plate 11. For example, the first transitional frame 11 may be provided on a first side (for example, lower side in FIG. 4) of the back plate 11, and the light guide plate 14 may be provided on a second side (for example, upper side in FIG. 4) of the back plate 11, and the first side is opposite to the second side. The outer frame 2 and the light guide plate 14 are disposed on the same side of the back plate 11. For example, the outer frame 2 and the light guide plate 14 may both be located on the second side of the back plate 11. The outer frame 2 is fixedly connected with the first transitional frame 11, so that the outer frame 2 is fixedly connected with the back plate 11 through the first transitional frame 11. In this way, the backlight module 100 may be formed into an integrated component, and the outer frame 2 is not directly connected with the back plate 11.

It may be understood that fixing manners between the back plate 11 and the first transitional frame 12 are not specifically limited herein. For example, the back plate 11 and the first transitional frame 12 may be detachably connected or non-detachably connected (for example, the back plate 11 and the first transitional frame 12 may be formed as a single piece) with each other. For example, if the back plate 11 and the first transitional frame 12 are separately formed and connected by means of assembly, a structure of the back plate 11 may be simplified, and the first transitional frame 12 may support both the back plate 11 and the outer frame 2 effectively, thereby ensuring a structural strength of the backlight module 100.

In the related art, the outer frame is directly fixed onto the back plate by a back lock screw. As a result, in order to facilitate an installation of the back lock screw during the assembly process, it is required to use auxiliary jigs for limiting a position in order to flip the outer frame and the backlight assembly, resulting in a complicated, time-consuming, low-efficiency and high-cost production.

Advantageously, in the backlight module 100 according to the embodiments of the present disclosure, the first transitional frame 12 is provided, and the outer frame 2 and the first transitional frame 12 are fixedly connected so that the outer frame 2 is fixedly connected with the back plate 11 through the first transitional frame 12, thereby ensuring that the outer frame 2 is securely installed. Moreover, the first transitional frame 12 may support the back plate 11, thereby improving a structural stability of the backlight module 100. Further, during an assembly process of the backlight module 100, the outer frame 2 and the backlight assembly 1 may be flipped in less times and the auxiliary jigs may be used in less times, thereby effectively simplifying assembling jigs of the backlight module 100, improving the production efficiency and reducing production cost. In other words, the backlight module 100 according to the embodiments of the present disclosure may improve the production efficiency and reduce the production cost on the premise of ensuring that the outer frame 2 is securely installed.

In some embodiments of the present disclosure, the outer frame 2 includes a first surface frame 21 located above the back plate 11 and a first side frame 22 located on a side of the first surface frame 21 and surrounding the back plate 11. The first transitional frame 12 includes a second surface frame 121 and a second side frame 122 on a side of the second surface frame 121. The first side frame 22 includes a first extension 221 that extends toward the back plate 11 and surrounds the second side frame 122. The first extension 221 is connected with the second side frame 122.

For example, as shown in FIG. 4 and FIGS. 8 to 10, the first side frame 22 may be located on an outer side of the first surface frame 21, and the first side frame 22 is connected with the first surface frame 21. The second side frame 122 may be located on an outer side of the second surface frame 121, and the second side frame 122 is connected with the second surface frame 121. The first surface frame 21 and the second surface frame 121 may be oppositely disposed in a thickness direction of the backlight module 100 (for example, up-down direction in FIGS. 2 and 3). The first extension 221 may extend toward the back plate 11 in the thickness direction of the backlight module 100 to surround the second side frame 122. In this way, the first extension 221 and the second side frame 122 may be fixedly connected so as to lock the outer frame 2 and the first transitional frame 12. Therefore, the outer frame 2 and the first transitional frame 12 have a simple structure, so that it facilitates locking the outer frame 2 and the first transitional frame 12 quickly. Moreover, the outer frame 2 may be used as a frame of the backlight module 100. When the backlight module 100 is applied to a display device 200, the outer frame 2 may also be used as a product outer frame, thereby effectively saving structural components of the display device 200, simplifying a structure of the display device 200, and reducing cost of parts and production cost of the product.

Further, as shown in FIG. 4 and FIGS. 8 to 10, the backlight module 100 further includes a first sideward lock member 3. The first extension 221 and the second side frame 122 are fixedly connected by the first sideward lock member 3, thereby ensuring that the outer frame 2 and the first transitional frame 12 are firmly connected.

For example, in the examples of FIG. 4 and FIGS. 8 to 10, the first sideward lock member 3 may be inserted inward from a radial outer side of the backlight module 100 to pass through the outer frame 2 and the first transitional frame 12 in sequence so as to lock the outer frame 2 and the first transitional frame 12, thereby facilitating the installation of the first sideward lock member 3. Moreover, during the assembly process of the backlight module 100, the second side of the backlight assembly 1 may be placed upward, and the outer frame 2 may be disposed on the second side of the backlight assembly 1. In this way, it is not necessary to flip the outer frame 2 and the backlight assembly 1, and thus it is not necessary to use the auxiliary jigs which are used to limit the outer frame 2 and the backlight assembly 1 during a flipping process. In the embodiments of the present disclosure, the first sideward lock member 3 may be used to directly lock the outer frame 2 and the first transitional frame 12 from the radial outer side of the backlight module 100, thereby simplifying the manufacturing process of the backlight module 100. Therefore, the manufacturing process is simple, so that it is convenient to effectively improve the production efficiency of the product and it is conducive to reducing the production cost.

It should be noted that, in the descriptions of the present application, "radial" may be understood as a direction perpendicular to a central axis 100a of the backlight module 100, and "radial outer side" may refer to a radial side away from the central axis 100a of the backlight module 100, while a side opposite to the radial side away from the central axis 100a may be referred to as "radial inner side" (or simply referred to as "inner side").

Optionally, in the examples of FIG. 4 and FIGS. 8 to 10, the first sideward lock member 3 is a sideward lock screw 30. A first through hole 221a is formed in the first extension 221. A first threaded connection hole 122a is formed in the second side frame 122. For example, the first threaded connection hole 122a may be formed as a through hole or a blind hole. The sideward lock screw 30 passes through the first through hole 221a, and the sideward lock screw 30 is screwed into the first threaded connection hole 122a. For example, the sideward lock screw 30 penetrates the first extension 221 in a direction perpendicular to the thickness of the backlight module 100, and the sideward lock screw 30 is threadedly connected with the second side frame 122. In this way, the first sideward lock member 3 has a simple structure and low cost. Moreover, it is convenient to further ensure that the outer frame 2 is firmly connected with the first transitional frame 12.

It can be understood that the first sideward lock member 3 may also be other lock members, and is not limited to the sideward lock screw 30. The first sideward lock member 3 may also lock the outer frame 2 and the first transitional frame 12 in other directions, for example, in a direction which has an included angle less than 90 degrees relative to the thickness direction of the backlight module 100.

In some embodiments of the present disclosure, the second side frame 122 extends from an outer edge of the second surface frame 121 toward the outer frame 2 so that the second side frame 122 and the second surface frame 121 collectively define a bearing groove 120 having an accommodation space. The back plate 11 includes an edge portion 113 and a flange portion 110 provided on an edge of the edge portion 113 and extending toward the first surface frame 21. Both the edge portion 113 and the flange portion 110 are installed in the bearing groove 120.

For example, as shown in FIGS. 4-10, the second side frame 122 extends from the outer edge of the second surface frame 121 to a top side (for example, an upper side in FIGS. 3 and 4) of the backlight module 100, so that the second side frame 122 and the second surface frame 121 may constitute a substantially L-shaped structure, and the second side frame 122 and the second surface frame 121 collectively define the bearing groove 120 which is open on both the top side and the inner side. The edge of the back plate 11 may include the edge portion 113 and the flange portion 110, and the edge of the back plate 11 is installed in the bearing groove 120. In this way, the second surface frame 121 may be located on a back side (for example, lower side in FIGS. 3 and 4) of the back plate 11, and the second side frame 122 may be located on the outer side of the back plate 11. When the outer frame 2 is fixedly connected with the back plate 11 through the first transitional frame 12, the first transitional frame 12 may support and protect the edge of the back plate 11, thereby effectively ensuring a structural strength of the backlight module 100 and avoiding damage of the backlight module 100 due to fall.

Figure 2:
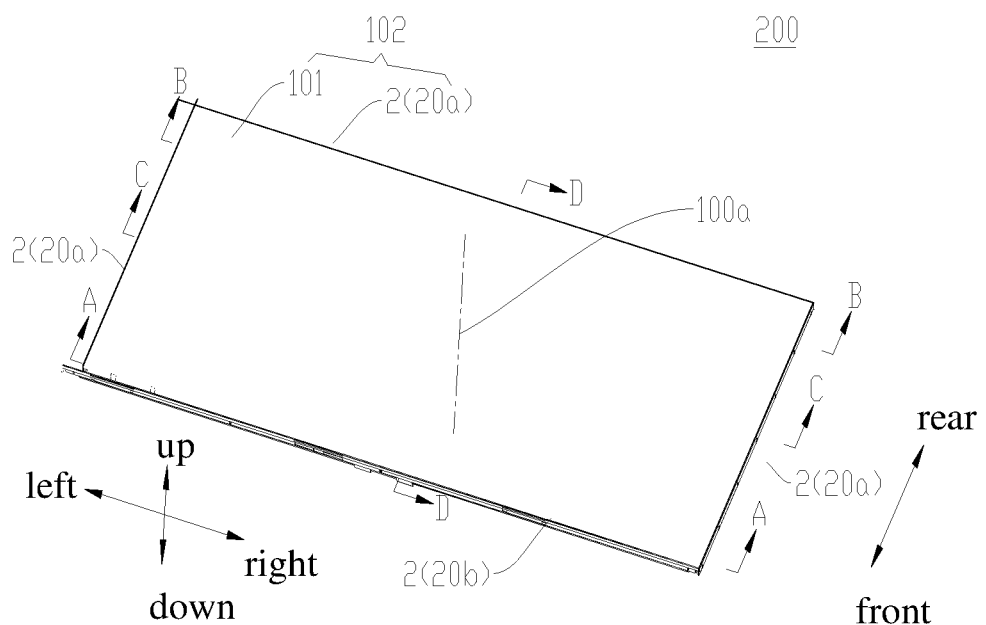
FIG. 2 is a schematic structural view of the display device shown in FIG. 1 from another angle of view.
Figure 3:
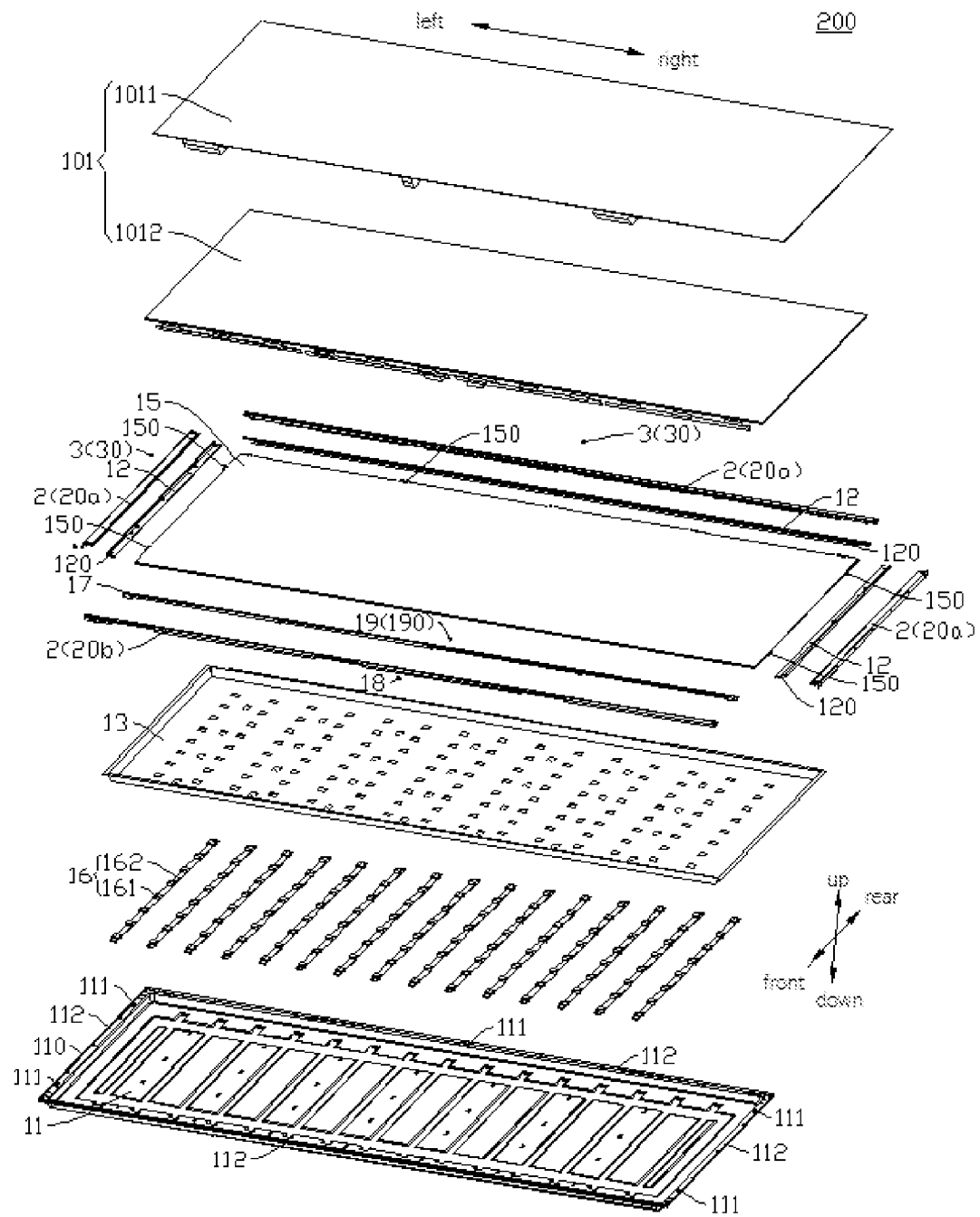
FIG. 3 is an exploded view of the display device shown in FIG. 2.

It should be noted that, in the descriptions of the present application, an expression such as "thickness direction of the backlight module" or "thickness direction of the display device" may be understood as a light exiting direction of the backlight module or the display device, for example, the up-down direction in FIGS. 2 and 3, or an extension direction of the central axis 100a of the backlight module 100.

It should be noted that, in the descriptions of the present application, a directional expression "top side" may be understood as a side of the backlight module 100 close to the user in the thickness direction (for example, the up-down direction in FIGS. 2 and 3 or the extension direction of the central axis 100a of the backlight module 100) of the backlight module 100 when the user uses the backlight module 100. A side opposite to the "top side" may be referred to as "back side". For example, in the examples of FIGS. 1 and 3, "the top side of the backlight assembly 1" may refer to the upper side of the backlight assembly 1, and "the back side of the backlight assembly 1" may refer to the lower side of the backlight assembly 1.

Figure 10:
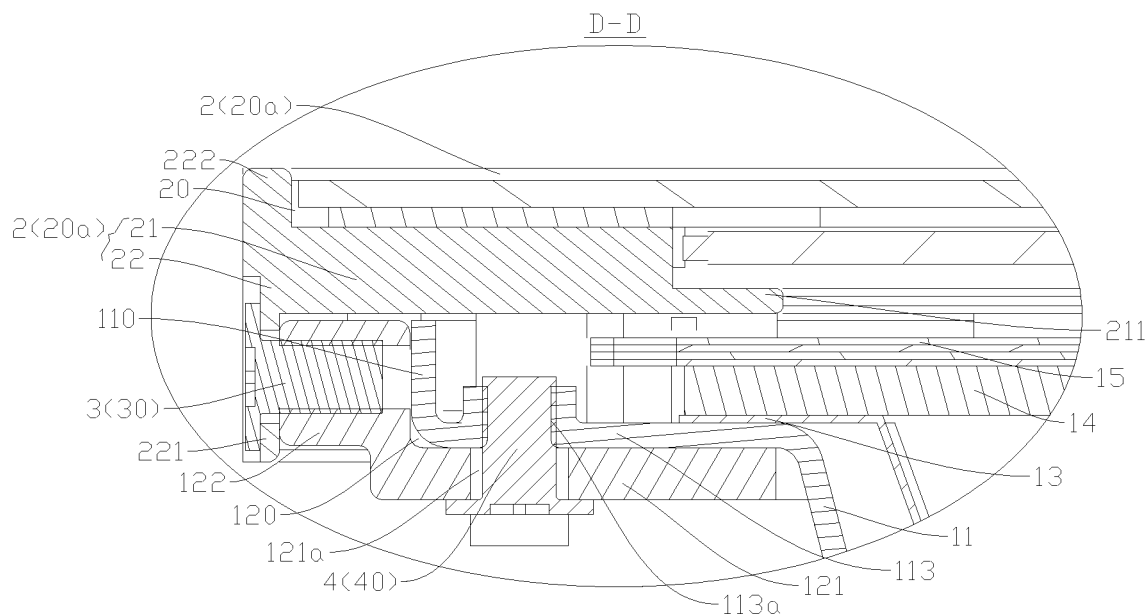
FIG. 10 is a partial cross-sectional view taken along line D-D in FIG. 2.

Further, as shown in FIG. 10, the backlight module 100 further includes a first back lock member 4. The second surface frame 121 and the edge portion 113 are locked and connected by the first back lock member 4 to facilitate a fixed connection between the first transitional frame 12 and the back plate 11. The first back lock member 4 may lock the second surface frame 121 and the edge of the back plate 11 from the back side of the backlight module 100. The first back lock member 4 may be threaded through the second surface frame 121 and the edge portion 110 from the back side (for example, the lower side in FIG. 10) of the backlight module 100 toward the top side (for example, the upper side in FIG. 10) of the backlight module 100 to lock the first transitional frame 12 and the back plate 11, thereby ensuring a firm connection between the first transitional frame 12 and the back plate 11. Moreover, when the backlight module 100 is applied to the display device 200, the first back lock member 4 is not exposed in the user's field of vision during the user uses the display device, thereby improving the appearance of the display device 200. In addition, an interference between the first back lock member 4 and the display screen 101 may be avoided, so that the display device 200 may have a large display area and a good display effect.

Optionally, in the example of FIG. 10, the first back lock member 4 is a first back lock screw 40. A second through hole 121a is formed in the second surface frame 121. A second threaded connection hole 113a is formed in the edge portion 113. The first back lock screw 40 passes through the second through hole 121a, and the first back lock screw 40 is screwed into the second threaded connection hole 113a. For example, the first back lock screw 40 penetrates the second surface frame 121 in the thickness direction of the backlight module 100 and the second back lock screw 40 is screwed into the edge of the back plate 11. In this way, the first back lock member 4 has a simple structure and low cost, and it further facilitates ensuring that the first transitional frame 12 and the back plate 11 are firmly connected.

It can be understood that the first back lock member 4 may also be other lock members, and is not limited to the back lock screw. The first back lock member 4 may also lock the first transitional frame 12 and the back plate 11 in other directions, for example, in a direction which is inclined with respect to the thickness direction of the backlight module 100.

In some embodiments of the present disclosure, as shown in FIGS. 4-10, the backlight assembly 1 further includes a reflective sheet 13 disposed on the top side of the back plate 11, a light guide plate 14 disposed on the top side of the reflective sheet 13, and a backlight film 15 disposed on the top side of the light guide plate 14. An edge of the reflective sheet 13, an edge of the light guide plate 14, and an edge of the backlight film 15 are all located in the bearing groove 120, and the edge of the reflective sheet 13, the edge of the light guide plate 14, and the edge of the backlight film 15 are all located on the top side of the edge of the back plate 11. The flange portion 110 is formed at the edge of the back plate 11. The edge of the reflective sheet 13, the edge of the light guide plate 14, and the edge of the backlight film 15 are all located inside the flange portion 110. The first transitional frame 12 may also support and protect the edge of the reflective sheet 13, the edge of the light guide plate 14, and the edge of the backlight film 15, thereby further ensuring the structural strength of the backlight module 100 and avoiding the damage of the backlight mode 100 due to fall.

For example, in the examples of FIGS. 4 to 10, the reflective sheet 13 may be adhered to the top side surface of the back plate 11. Both the light guide plate 14 and the backlight film 15 may be formed in a flat plate structure. The light guide plate 14 and the backlight film 15 may be sequentially stacked on the top side of the reflective sheet 13. The light guide plate 14 may guide light from a light source 16 of the backlight assembly 1 to improve brightness. The backlight film 15 may enhance the light. The backlight module 100 has good applicability, which is convenient for improving the user experience effect.

For example, in order to ensure an adhesion strength between the reflective sheet 13 and the back plate 11, the reflective sheet 13 may match in structure and shape with the back plate 11, but the embodiments are not limited thereto. The backlight film 15 may include a diffusion sheet and/or an anti-reflection film.

In the examples of FIGS. 4-10, the first surface frame 21 includes a first limiting portion 211 extending away from the first side frame 22 and extending above the back plate 11. The backlight film 15 is provided on the back plate 11. The edge of the backlight film 15 is sandwiched between the first limiting portion 211 and the back plate 11, so that the back plate 11 and the first limiting portion 211 may limit the backlight film 15, thereby facilitating a quick installation of the backlight film 15. For example, the first limiting portion 211 may extend to the top side (for example, upper side in FIG. 4) of the edge of the backlight film 15. The first limiting portion 211 may be located inside the first surface frame 21, and the first limiting portion 211 may extend inward from an inner edge of the first surface frame 21. The first limiting portion 211 may restrict a movement of the backlight film 15 in the thickness direction (for example, the up-down direction in FIG. 4) of the backlight module 100, thereby facilitating limiting the backlight film 15 and ensuring an effective fix of internal films of the backlight module 100 without setting other limiting structures. Therefore, the structure is simple.

In some embodiments of the present disclosure, as shown in FIGS. 6 to 9, FIG. 13, and FIG. 15, a protrusion 111 for positioning is formed on the edge portion 113. The protrusion 111 is fixedly connected with the back plate 11, and the protrusion 111 is spaced apart from the flange portion 110. For example, the protrusion 111 may be located inside the flange portion 110. The backlight film 15 is provided on the back plate 11, and the backlight film 15 may be provided on a side of the light guide plate 14 distal to the back plate 11.

The light guide plate 14 may be provided between the back plate 11 and the backlight film 15. The backlight film 15 is provided with a positioning hole 150 which is positionally fitted with the protrusion 111 to facilitate the positioning of the backlight film 15. The light guide plate 14 is provided with a positioning groove 140 which is positionally fitted with the protrusion 111 to facilitate the positioning of the light guide plate 14.

For example, the protrusion 111 may be formed by extending a part of a top surface of the back plate 11 toward the top side of the back plate 11, and the positioning hole 150 may penetrate the backlight film 15 in the thickness direction of the backlight module 100. The operator may check a position of the positioning hole 150 so that the positioning protrusion 111 may be quickly fitted into the positioning hole 150 to realize the positioning of the backlight film 15. The positioning groove 140 may be formed by inwardly recessing an outer surface of the light guide plate 14 to facilitate processing. Optionally, there may be no positioning groove 140 formed in the outer surface of the light guide plate 14 that is positionally fitted with the protrusion 11, in this case, the outer surface of the light guide plate 14 may be directly positioned against the protrusion 111, thereby realizing the positioning of the light guide plate 14.

Figure 6:
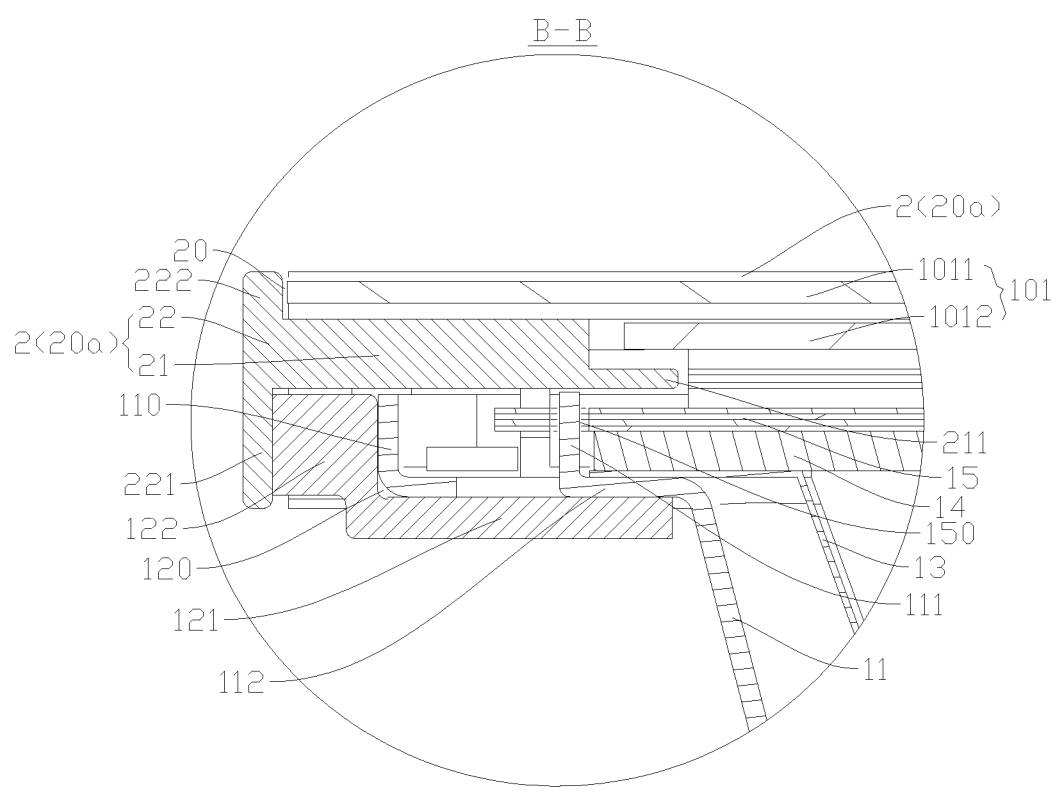
FIG. 6 is a partial cross-sectional view taken along line B-B in FIG. 2.
Figure 7:
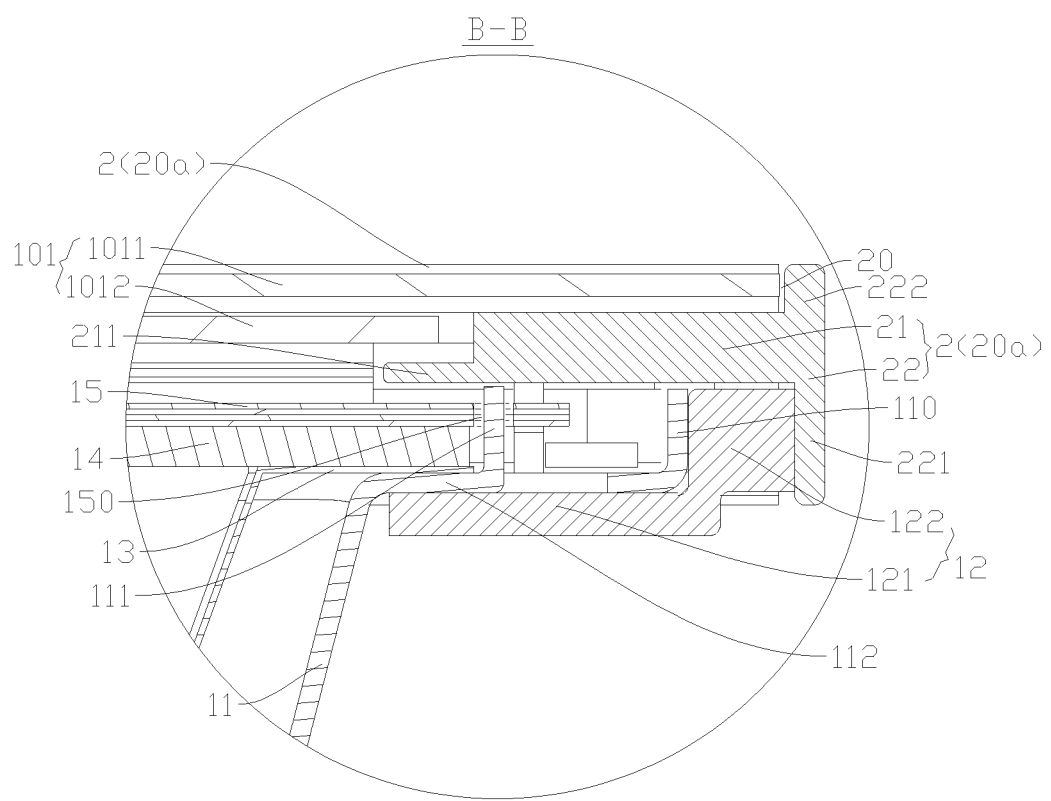
FIG. 7 is another partial cross-sectional view taken along line B-B in FIG. 2.
Figure 8:
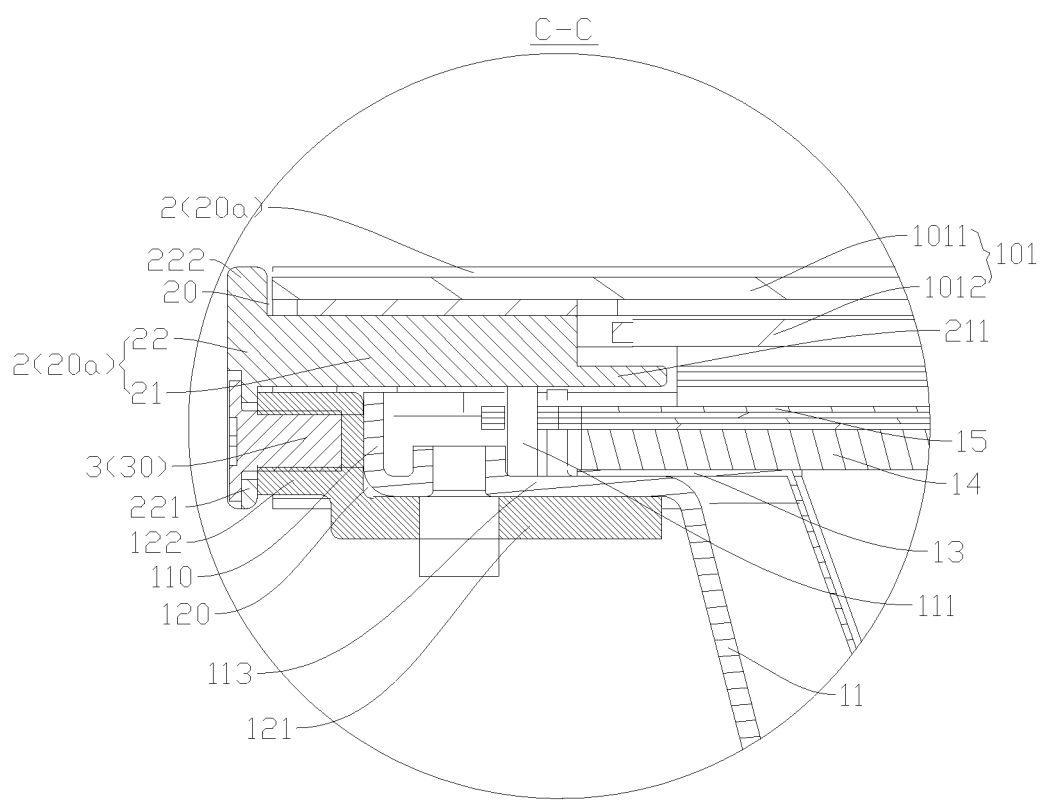
FIG. 8 is a partial cross-sectional view taken along line C-C in FIG. 2.
Figure 9:
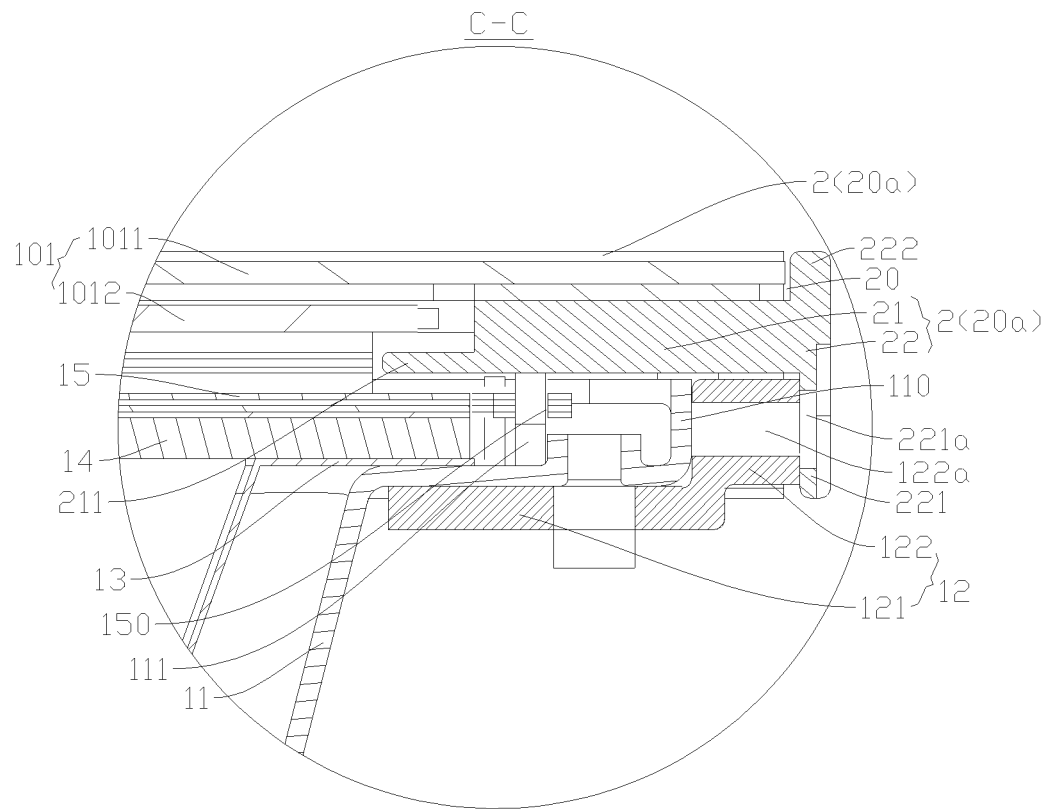
FIG. 9 is another partial cross-sectional view taken along line C-C in FIG. 2.

Optionally, in the examples of FIGS. 3, 6, and 7, the protrusion 111 may be formed by extending an edge of a punched hole in the back plate 11 toward the top side of the back plate 11. There may be a plurality of protrusions 111. The protrusions 111 may be arranged at intervals in an extending direction of the edge of the back plate 11. However, the embodiments of the present disclosure are not limited thereto. In the description of the present disclosure, "a plurality of" means two or more.

Figure 11:
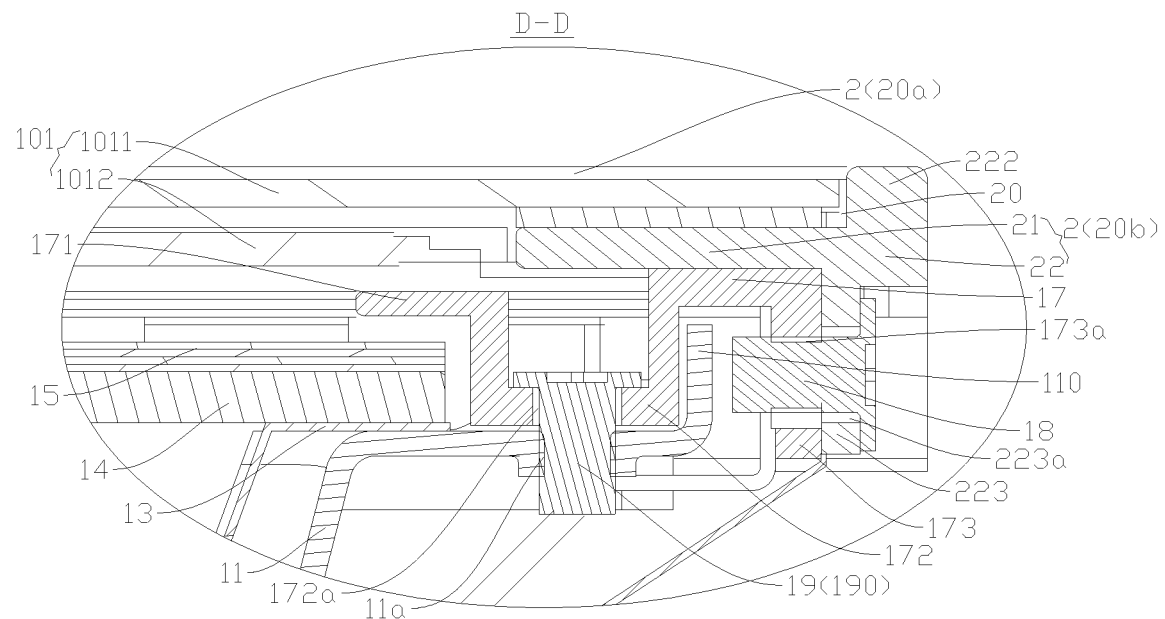
FIG. 11 is another partial cross-sectional view taken along line D-D in FIG. 2.
Figure 12:
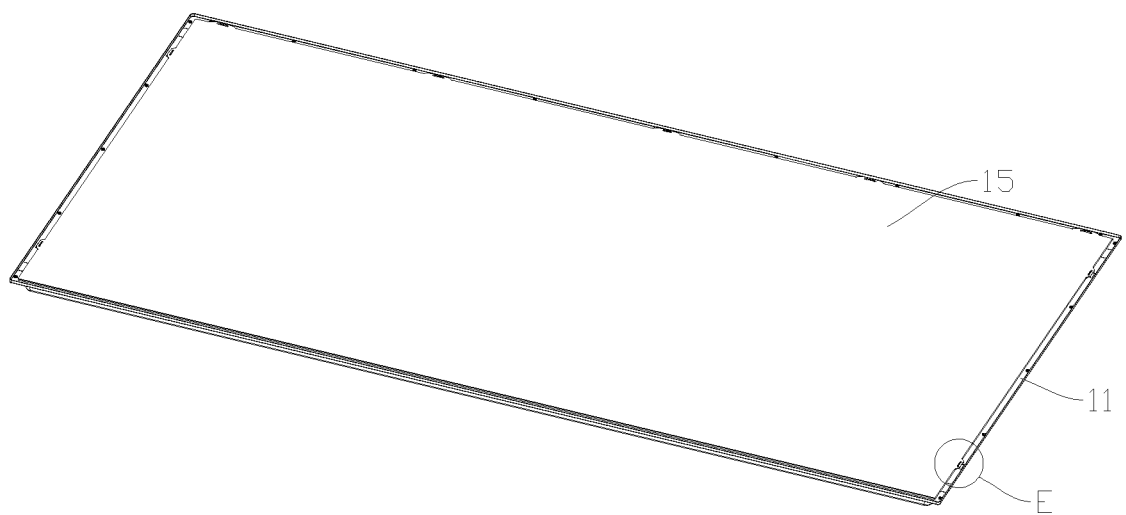
FIG. 12 is a schematic assembly view of a back plate, a light guide plate, and a backlight film shown in FIG. 3.
Figure 13:
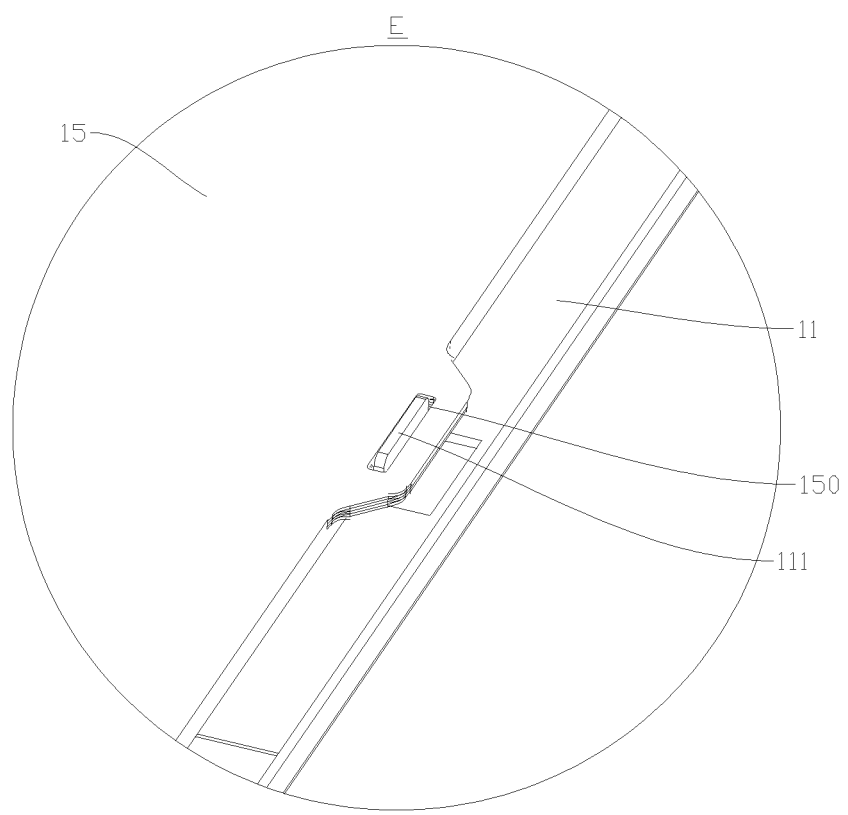
FIG. 13 is an enlarged view of a portion E circled in FIG. 12.
Figure 14:
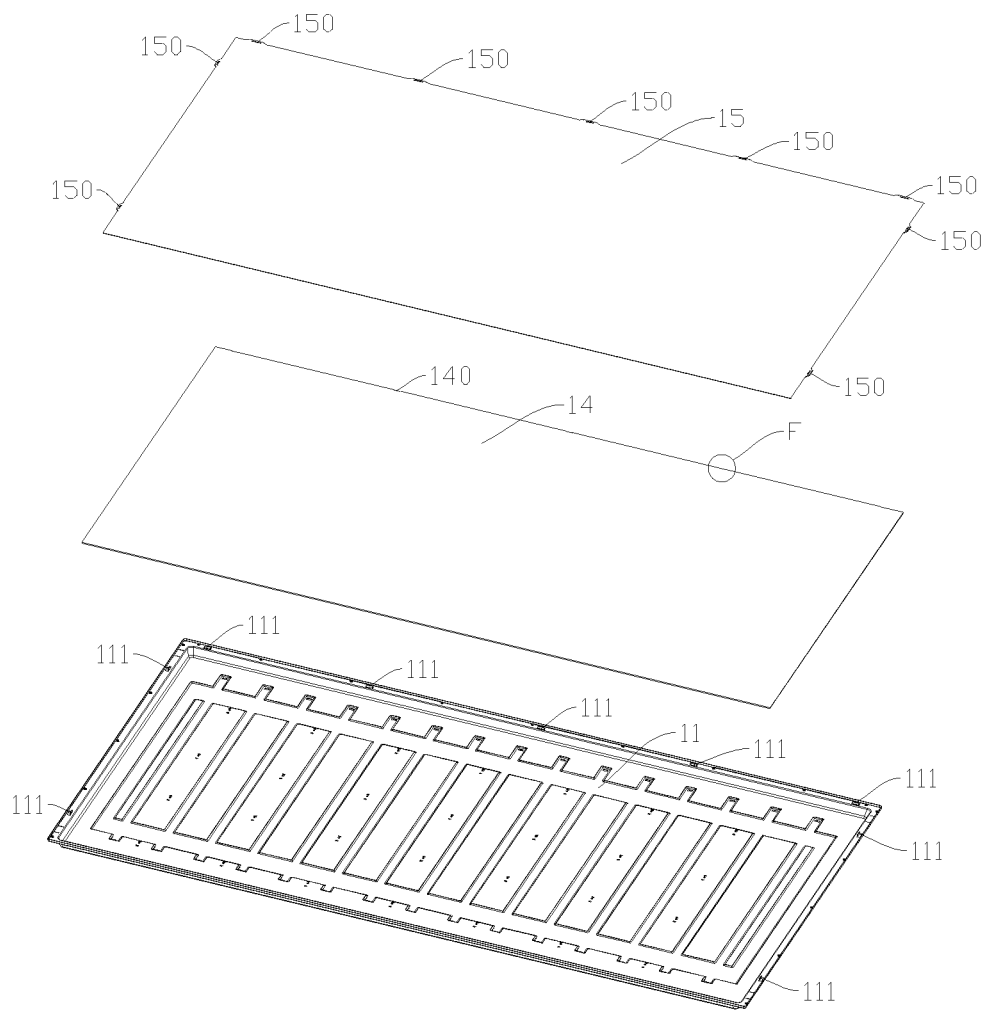
FIG. 14 is an exploded view of the back plate, the light guide plate, and the backlight film shown in FIG. 12.
Figure 15:
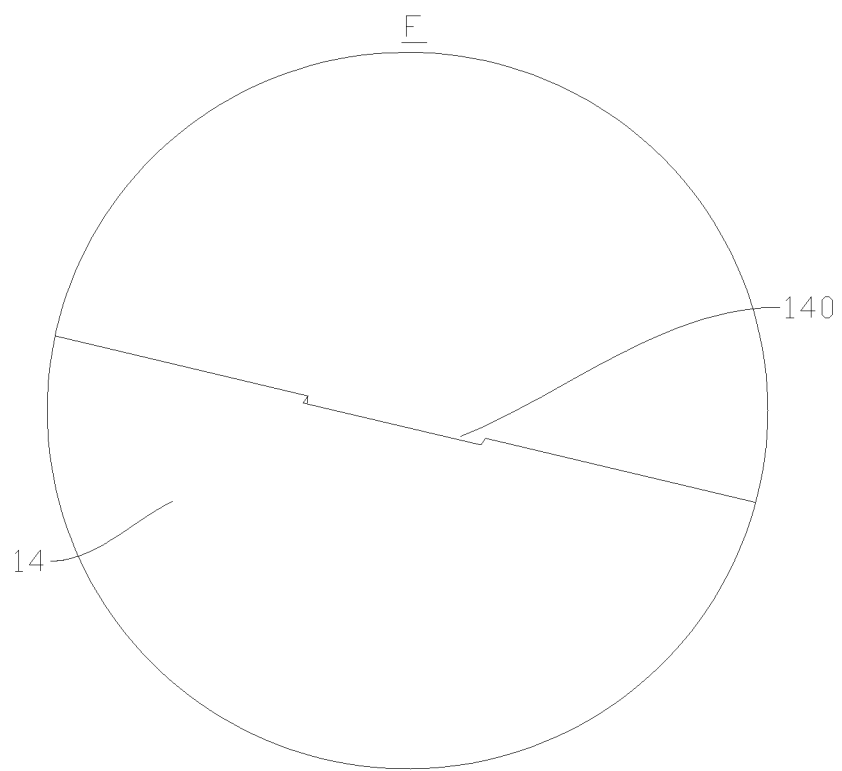
FIG. 15 is an enlarged view of a portion F circled in FIG. 14.

Further, as shown in FIGS. 3 and 11, the backlight assembly 1 further includes a second transitional frame 17. The back plate 11 includes four flange portions 110 surrounding the edge portion 113. The second transitional frame 17 is disposed correspondingly to one of the flange portions 110, and the first transitional frames 12 are disposed correspondingly to the other three flange portions 110. The second transitional frame 17 and the outer frame 2 are located on the same side of the back plate 11. The second transitional frame 17 includes a first connection portion 172, a second connection portion 173 and a second limiting portion 171. The first connection portion 172 and the second limiting portion 171 are both located inside the corresponding flange portion 110, and the second limiting portion 171 extends above the backlight film 15. The second connection portion 173 is located outside the corresponding flange portion 110. For example, the edge of the back plate 11 includes four sub-edges 112 that are connected end-to-end to form a quadrangle. Each sub-edge 112 may include a flange portion 110. The second transitional frame 17 is provided at one of the sub-edges 112. The second transitional frame 17 is located on the top side of the back plate 11. The second transitional frame 17 is fixedly connected with the back plate 11. The first transitional frames 12 are provided at the other three sub-edges 112. The first transitional frames 12 may be located on the back side of the back plate 11. The second transitional frame 17 includes the second limiting portion 171 extending to the top side of the edge of the backlight film 15, the second limiting portion 171 may be located inside the second transitional frame 17, and the second limiting portion 171 may restrict the movement of the backlight film 15 in the thickness direction of the backlight module 100, thereby facilitating a pre-limiting of the backlight film 15 without providing other pre-limiting structures.

In this way, it facilitates a subsequent assembly of the backlight module 100, and the backlight module 100 has a simple structure. When the backlight module 100 is applied to the display device 200, the second transitional frame 17 is convenient to meet routing requirements of circuit connection lines of the display device 200, and the second transitional frame 17 is prevented from interfering with an arrangement of the circuit connection lines. That is, the circuit connection lines may extend from the inner side of the backlight module 100 to the outer side of the backlight module 100 through the sub-edge 112 where the second transitional frame 17 is disposed. The arrangement of the circuit connection lines is well known to those skilled in the art, and is not repeated here.

It should be noted that, in this context, "disposed correspondingly" may mean that two components are opposite to each other. Specifically, "the second transitional frame 17 is disposed correspondingly to one of the flange portions 110" may mean that the second transitional frame 17 and one of the flange portions 110 are opposite to each other in a direction perpendicular to the thickness direction of the backlight module; and "the first transitional frames 12 are disposed correspondingly to the other three flange portions 110" may mean that each first transitional frame 12 and one of the other three flange portions 110 are opposite to each other in the direction perpendicular to the thickness direction of the backlight module.

As shown in FIGS. 3 and 11, the backlight assembly 1 may further include a second sideward lock member 18. The first side frame 22 includes a third extension 223 extending toward the back plate 11 and surrounding the second connection portion 173. It is to be understood that: the first side frame 22 of the outer frame 2 corresponding to the second transitional frame 17 includes the third extension 223, and the first side frame 22 of the outer frame 2 corresponding to the first transitional frame 12 includes the first extension 221. A third through hole 223a is formed in the third extension 223, a third threaded connection hole 173a is formed in the second connection portion 173, the second sideward lock member 18 passes through the third through hole 223a, and the second sideward lock member 18 is screwed into the third threaded connection hole 173a.

For example, the second sideward lock member 18 may be inserted inward from the outer side of the backlight module 100 to pass through the outer frame 2 and the second transitional frame 17, so as to lock the outer frame 2 and the second transitional frame 17, further ensuring that the outer frame 2 and the backlight assembly 1 are firmly connected. Moreover, during the assembly process of the backlight module 100, the top side of the backlight assembly 1 may be placed upward, and the second transitional frame 17 may be fixed on the back plate 11, and then the outer frame 2 is disposed on the top side of the backlight assembly 1. In this case, it is not necessary to flip the outer frame 2 and the backlight assembly 1, and it is not necessary to use the auxiliary jigs that are required to limit the outer frame 2 and the backlight assembly 1 during the flip process. That is, the second sideward lock member 18 is used to lock the outer frame 2 and the second transitional frame 17 directly from the side of the backlight module 100, thereby simplifying the manufacturing process of the backlight module 100. In this way, the manufacturing process is simple, so that it is convenient to effectively improve the production efficiency of the product and is conducive to reducing the production cost.

Further, as shown in FIG. 3 and FIG. 11, the backlight assembly 1 further includes a top lock member 19. The top lock member 19 locks the first connection portion 172 and the back plate 11 from the upper side of the second transitional frame 17. The top lock member 19 may pass through the second transitional frame 17 and the back plate 11 from the top side of the backlight module 100 to the back side of the backlight module 100 to lock the second transitional frame 17 and the back plate 11, thereby ensuring that the second transitional frame 17 and the back plate 11 are firmly connected. Since the backlight film 15 is disposed on the top side of the back plate 11 and the second limiting portion 171 of the second transitional frame 17 extends to the top side of the edge of the backlight film 15, the top lock member 19 may be used to lock the second transitional frame 17 and the back plate 11 after the backlight film 15 has been installed. In the above processes, there is no need to flip the back plate 11, thus it is convenient for assembly.

Optionally, in the example of FIG. 11, the top lock member 19 is a top lock screw 190. A fourth through hole 172a is formed in the first connection portion 172, and a fourth threaded connection hole 11a is formed in the back plate 11. The top lock screw 190 passes through the fourth through hole 172a, and the top lock screw 190 is screwed into the fourth threaded connection hole 11a. For example, the top lock screw 190 penetrates the second transitional frame 17 in the thickness direction of the backlight module 100 and the top lock screw 190 is threadedly connected with the back plate 11, so that the top lock member 19 has a simple structure, low cost, and is convenient for further ensuring the second transitional frame 17 and the back plate 11 are firmly connected.

It can be understood that the top lock member 19 may also be other lock members, and is not limited to the top lock screw 190. The top lock member 19 may also lock the second transitional frame 17 and the back plate 11 in other directions, for example, in a direction which is inclined relative to the thickness direction of the backlight module 100.

Figure 16:
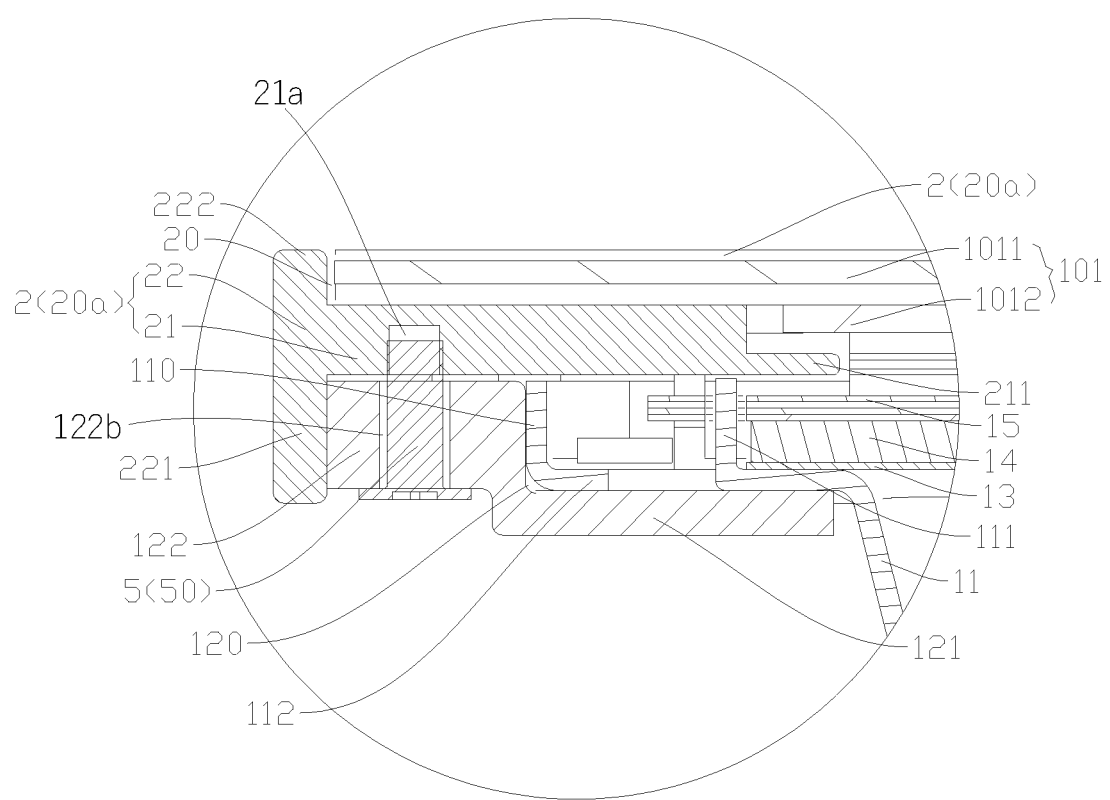
FIG. 16 is a partial cross-sectional view of a display device according to some embodiments of the present disclosure.

In some embodiments of the present disclosure, as shown in FIG. 16, the backlight module 100 further includes a second back lock member 5, and the second side frame 122 and the first surface frame 21 are connected and locked by the second back lock member 5. In this way, a connection reliability between the first transitional frame 12 and the outer frame 2 is improved. For example, the second back lock member 5 may pass through the second side frame 122 and the first surface frame 21 from the back side of the backlight module 100 toward the top side of the backlight module 100 to lock the first transitional frame 12 and the outer frame 2, thereby improving the connection reliability between the first transitional frame 12 and the outer frame 2, and ensuring a structural stability and a use reliability of the backlight module 100.

Optionally, in the example of FIG. 16, the second back lock member 5 is a second back lock screw 50. A fifth through hole 122b is formed in the second side frame 122, and a fifth threaded connection hole 21a is formed in the first surface frame 21. The second back lock screw 50 passes through the fifth through hole 122b, and the second back lock screw 50 is screwed into the fifth threaded connection hole 21a. For example, the second back lock screw 50 passes through the second side frame 122 in the thickness direction of the backlight module 100 and the second back lock screw 50 is screwed into the first surface frame 21, so that the second back lock member 5 has a simple structure and low cost. In this way, it is convenient to further ensure that the first transitional frame 12 and the outer frame 2 are connected firmly.

It can be understood that the second back lock member 5 may also be other lock members, and is not limited to the back lock screw. The second back lock member 5 may also lock the first transitional frame 12 and the outer frame 2 in other directions, for example, in a direction which is inclined with respect to the thickness direction of the backlight module 100.

As shown in FIG. 3, the outer frame 2 may include a first outer frame 20*a* and a second outer frame 20*b*. The first outer frame 20*a* is disposed correspondingly to the first transitional frame 12, and the second outer frame 20*b* is disposed correspondingly to the second transitional frame 17. Two adjacent first outer frames 20*a* are connected and spliced with each other, and adjacent first outer frame 20*a* and second outer frame 20*b* are connected and spliced with each other. In this way, it facilitates simplifying structures of the first outer frame 20*a* and the second outer frame 20*b*, and therefore, the outer frame 2 may be formed into an integrated component. The outer frame 2 may be integrally assembled onto the backlight assembly 1 to improve the assembling efficiency of the backlight module 100.

Some embodiments of the present disclosure also provide a display device 200. The display device 200 includes a display screen 101 and the backlight module 100 according to the embodiments described above. The outer frame 2 includes the first surface frame 21 above the back plate 11 and the first side frame 22 located on a side of the first surface frame 21 and surrounding the back plate 11. The display screen 101 is installed on the first surface frame 21 of the outer frame 2. For example, the display screen 101 may be adhered onto the first surface frame 21. In this way, it ensures that the display screen 101 is installed reliably and has good product aesthetics. The display screen 101 may be a touch display screen. For example, the display screen 101 may be a capacitive touch screen, but embodiments of the present disclosure are not limited thereto.

According to the display device 200 of the present disclosure, by using the above-mentioned backlight module 100, the assembly is reliable and it is convenient to improve the process efficiency.

Figure 4:
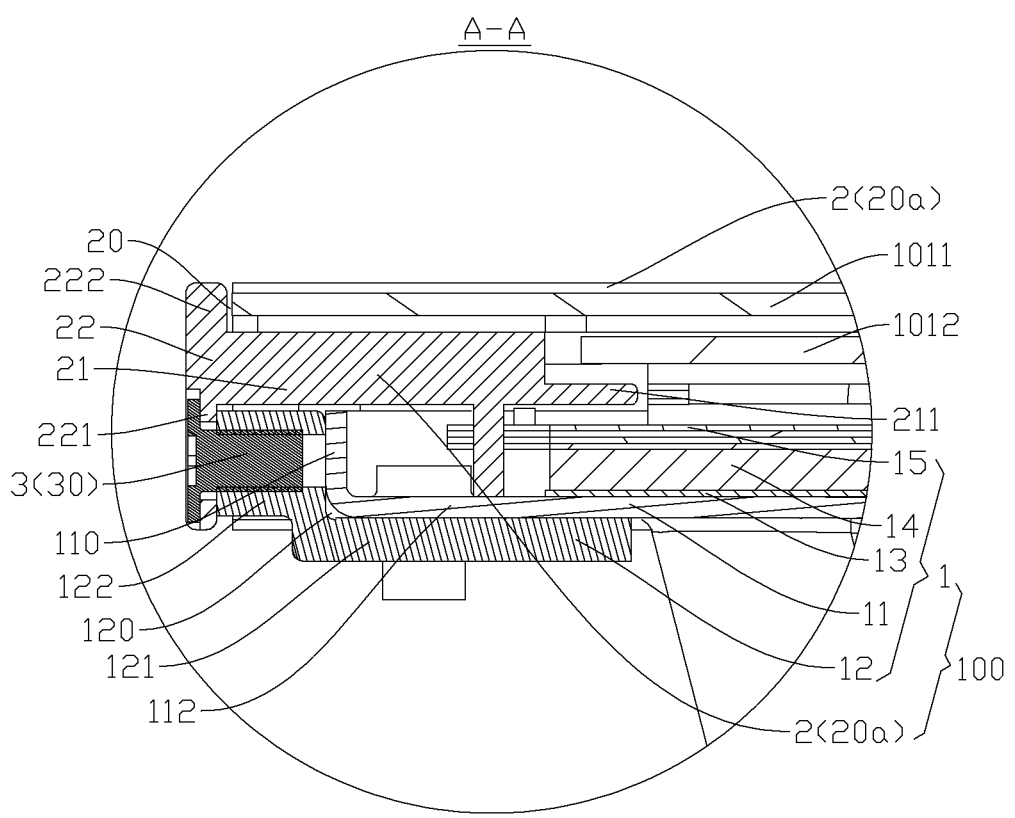
FIG. 4 is a partial cross-sectional view taken along line A-A in FIG. 2.

In some embodiments of the present disclosure, as shown in FIG. 4, the outer frame 2 further includes a second extension 222 extending toward the display screen 101. The display screen 101 is received into a receiving space 20 which is defined collectively by the first surface frame 21 and the second extension 22, thereby positioning and installing the display screen 101. For example, the receiving space 20 may be formed as a positioning groove, and the upper side of the receiving space 20 may be opened. An edge of the display screen 101 may be positionally fitted in the receiving space 20, so that the display screen 101 may be directly positionally fitted in the outer frame 2, thereby ensuring a positioning accuracy between the display screen 101 and the outer frame 2 and improving an appearance quality of the product.

For example, as shown in FIGS. 4 to 16, the outer frame 2 may include the first surface frame 21 and the first side frame 22 located outside the first surface frame 21. The first side frame 22 includes the second extension 222 extending toward the top side of the backlight module 100. The second extension 222 and the first surface frame 21 collectively define the receiving space 20 which is open at the top side. The display screen 101 is positionally fitted in the receiving space 20, and the edge of the display screen 101 may be positionally fitted onto an inner wall of the second extension 222.

It should be noted that the top side of the receiving space 20 is open, and it may be understood as the top side of the receiving space 20 is completely open, that is, a free end of the second extension 222 does not have a limit flange extending inward. In this way, it is convenient for implementing the display device 200 having an ultra-narrow frame design, thereby enhancing an appearance of the product and thus enhancing the user experience.

It can be understood that when the display screen 101 is adhered to the outer frame 2, a back adhesive may be adhered on the top surface of the first side frame 21 so as to attach the display screen 101 to the receiving space 20, thereby facilitating the assembly of the display screen 101.

Other configurations and operations of the display device 200 according to the embodiments of the present disclosure may be known to those skilled in the art, and will not be described in detail here.

Embodiments of the present disclosure also provide a method for assembling a display device. The display device 200 includes the backlight assembly 1 and the display screen assembly 102. The backlight assembly 1 includes the back plate 11 and the first transitional frame 12. The back plate 11 may be fixedly connected with the first transitional frame 12. The display screen assembly 102 includes the display screen 101 and the outer frame 2, and the display screen 101 may be fixedly connected with the outer frame 2.

The method may include the following steps: assembling the backlight assembly 1 and the display screen assembly 102 separately; disposing the assembled display screen assembly 102 on a light-exiting side of the assembled backlight assembly 1; and locking the outer frame 2 and the first transitional frame 12 by the first sideward lock member 3 from a radial outer side of the backlight module 100. The step of assembling the backlight assembly 1 may include: locking the first transitional frame 12 and the back plate 11 by the first back lock member 4 from the first side of the back plate 11, and sequentially installing the reflective sheet 13, the light guide plate 14 and the backlight film 15 on the second side of the back plate 11, the first side being opposite to the second side.

Figure 17:
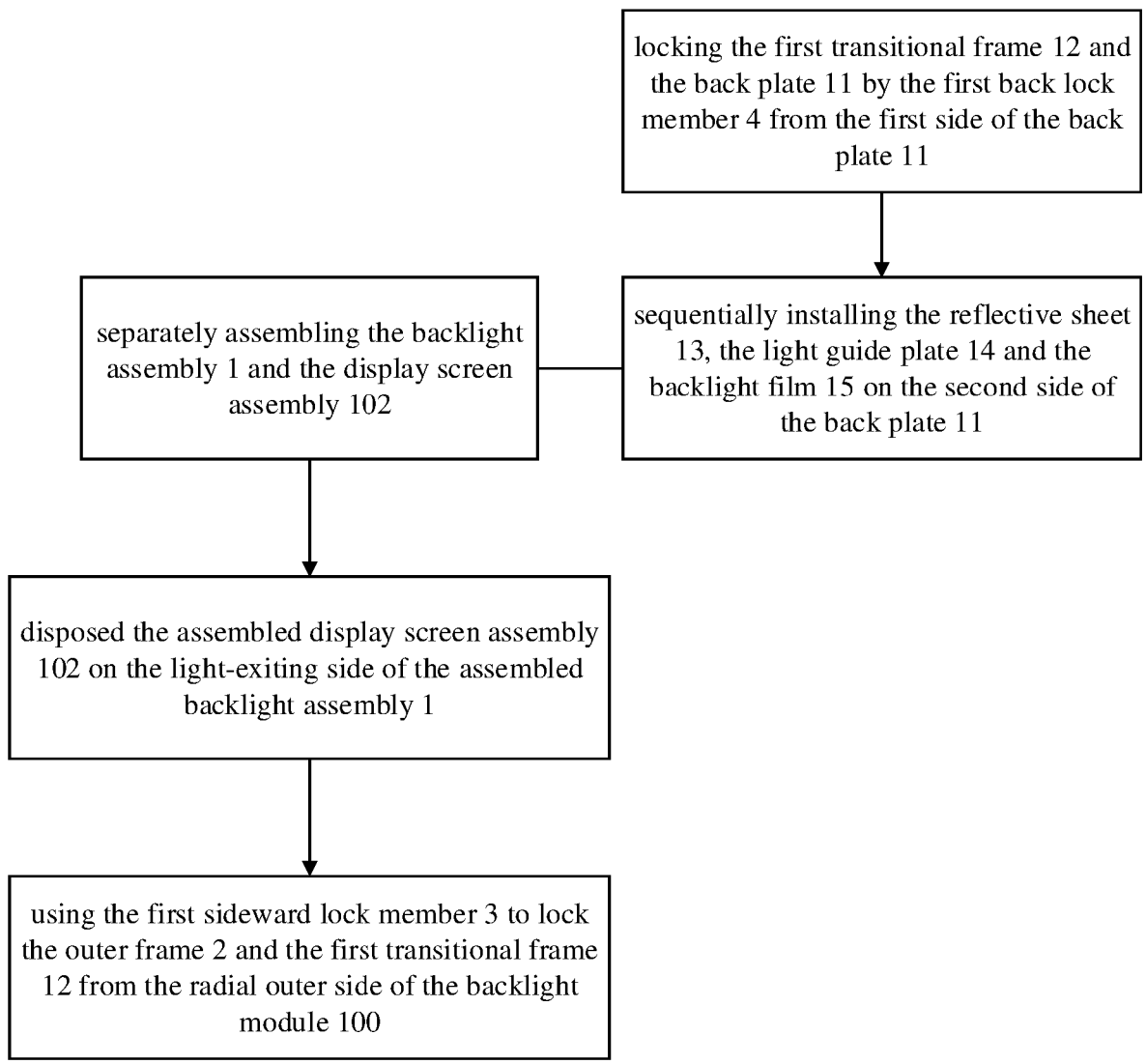
FIG. 17 is a schematic flowchart of a method for assembling a display device according to some embodiments of the present disclosure.
Figure 18:
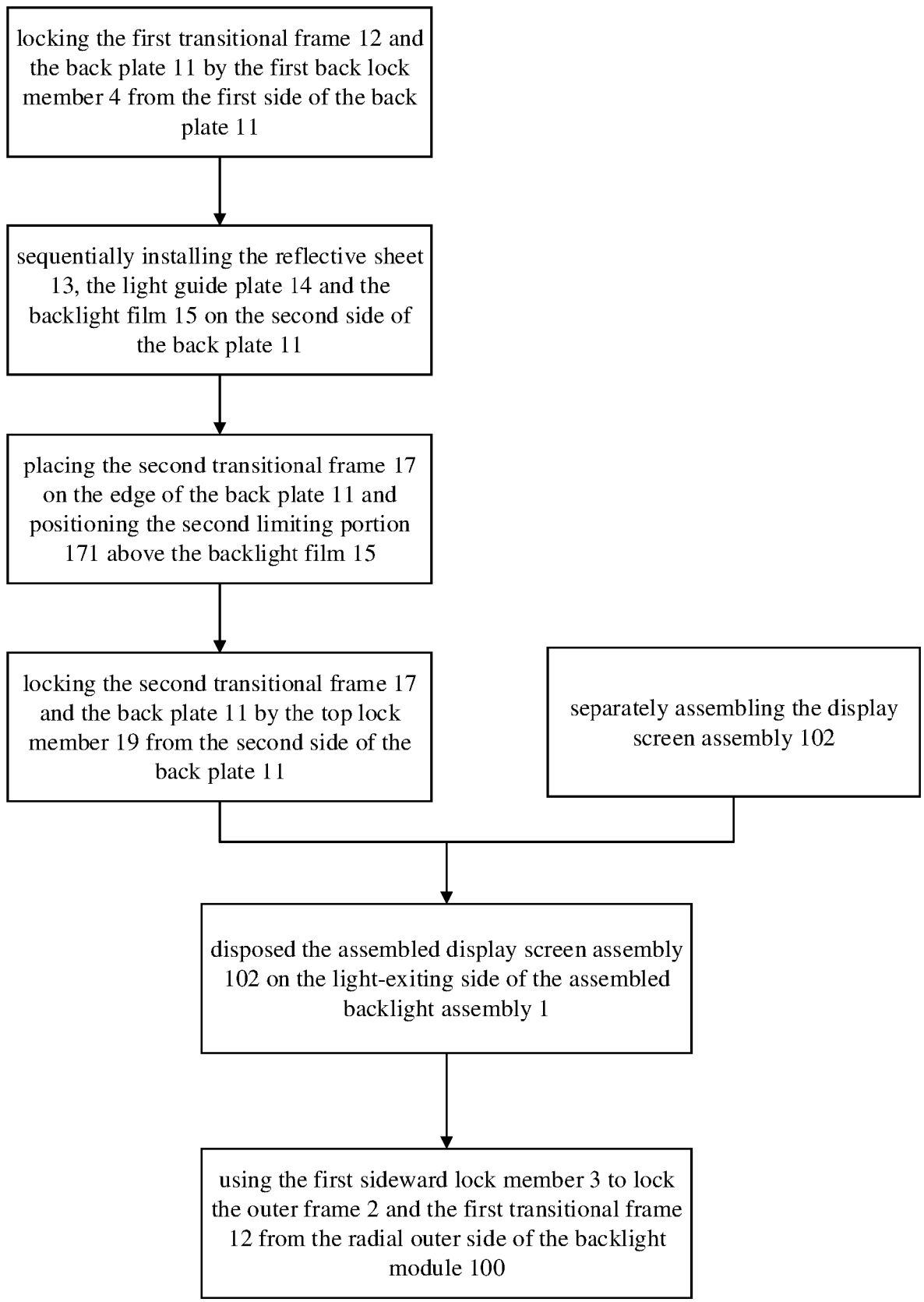
FIG. 18 is a schematic flowchart of a method for assembling a display device according to other embodiments of the present disclosure.

For example, as shown in FIG. 17 and FIG. 18, at first, the backlight assembly 1 and the display screen assembly 102 are separately assembled, that is, the step of assembling the backlight assembly 1 and the step of the display screen assembly 102 are separately performed. The step of assembling the backlight assembly 1 may include assembling the back plate 11 and the first transitional frame 12. The step of assembling the display screen assembly 102 may include assembling the display screen 101 and the outer frame 2. The step of assembling the backlight assembly 1 and the step of assembling the display screen assembly 102 are independent of each other and do not interfere with each other. Therefore, the step of assembling the backlight assembly 1 and the step of assembling of the display screen assembly 102 may be performed in parallel, thereby effectively improving an assembling efficiency of the display device 200.

When the backlight assembly 1 is assembled, the backlight assembly 1 may be placed horizontally or suspended. The first back lock member 4 may pass through the first transitional frame 12 and the edge of the back plate 11 in sequence from the first side of the back plate 11 to lock the first transitional frame 12 and the back plate 11. If the back plate 11 is placed horizontally, the back plate 11 and the first transitional frame 12 may be connected together and flipped, then the reflective sheet 13, the light guide plate 14 and the backlight film 15 are sequentially installed on the second side of the back plate 11.

Then, the assembled display screen assembly 102 is disposed on the light-exiting side of the assembled backlight assembly 1. For example, if the backlight assembly 1 is placed horizontally, the light-exiting side of the assembled backlight assembly 1 may be placed upward. If a backlight side of the backlight assembly 1 faces upward after the assembly of the backlight assembly 1 is completed, it is required to flip the backlight assembly 1 so that the light-exiting side of the backlight assembly 1 faces upward. If the light-exiting side of the backlight assembly 1 faces upward after the assembly of the backlight assembly 1 is completed, it is only required to keep the light-exiting side of the backlight assembly 1 facing upward without flipping the backlight assembly 1, thereby facilitating disposing the assembled display screen assembly 102 on the top side of the assembled backlight assembly 1 quickly.

Finally, the first sideward lock member 3 is used to lock the outer frame 2 and the first transitional frame 12 from the radial outer side of the backlight module 100, so that the backlight assembly 1 and the display screen assembly 102 are fixedly connected. During the process of locking the outer frame 2 and the first transitional frame 12, it is not necessary to flip the outer frame 2 and the first transitional frame 12, and it is not necessary to use the auxiliary jigs to limit the outer frame 2 and the first transitional frame 12. In this way, the number of flipping is reduced during a whole production process of the display device 200, thereby simplifying the production processes of the display device 200, saving operation steps, reducing production line operations, and achieving a simple manufacturing process. Therefore, it is convenient for effectively improving the production efficiency of the product and is beneficial to reducing the production cost.

The display screen assembly 102 may be operated in a preparation process of the production line, but is not limited thereto. During the step of assembling the display screen assembly 102, the step of assembling the display screen 101 and the outer frame 2 may be separately performed, and defects such as flash seam and mismatch on a top appearance of the display screen 101 may be particularly controlled, so that the defects such as flash seam and mismatch are easily controlled and adjusted. In this way, it is convenient for an operator to find a defective assembly, and it is convenient to repair the defective assembly of the display screen assembly 102 in time, so as not to affect the production line and waste the production time of the production line.

It can be understood that there may be one or more first sideward lock members 3. When there are a plurality of first sideward lock members 3, the plurality of first sideward lock members 3 may be arranged at intervals along the side edge of the backlight module 100 to ensure that the outer frame 2 and the first transitional frame are connected firmly.

In the method for assembling the display device 200 according to the embodiments of the present disclosure, no auxiliary jigs may be used and less flipping may be performed during the entire production process, thereby saving the operation steps and improving the production efficiency. Moreover, the defects such as flash seam and mismatch of the product appearance are easily controlled, adjusted and repaired in time. In this way, a normal production process of the production line is not affected and the production time is saved.

It may be understood that, in the method for assembling the display device 200 described above, the "display device 200" may be the display device 200 according to the above-mentioned embodiments of the present disclosure, or may not be the display device 200 according to the above-mentioned embodiments of the present disclosure.

In some embodiments of the present disclosure, as shown in FIG. 18, the step of assembling the backlight assembly 1 may include: placing the back side of the back plate 11 upward; placing the first transitional frame 12 on the back plate 11, that is, placing the first transitional frame 12 on the back side of the back plate 11; locking the edge of the back plate 11 and the first transitional frame 12 by the first back lock member 4 from the back side of the backlight module 100, that is, locking the back plate 11 and the first transitional frame 12 by the first back lock member 4 from the back surface of the backlight module 100 toward the top side of the backlight module 100. In this way, the first transitional frame 12 is simply and firmly installed.

There may be a plurality of first back lock members 4, and the plurality of first back lock members 4 may be disposed at intervals along the edge of the back plate 11.

In some embodiments of the present disclosure, as shown in FIGS. 3 to 7, the backlight assembly 1 further includes a light source 16, the reflective sheet 13, the light guide plate 14, and the backlight film 15. The light source 16, the reflective sheet 13, the light guide plate 14 and the backlight film 15 may be located on the top side of the back plate 11. The light guide plate 14 may be provided on the top side of the reflective sheet 13, and the backlight film 15 may be provided on the top side of the light guide plate 14. The light source 16 may include a light source member 161 and a mounting plate 162, and the light source member 161 may be mounted on the back plate 11 via the mounting plate 162. A through hole is formed in the reflective plate 13. The through hole is just opposite to the light source member 161 in the thickness direction of the backlight module 100. The light source member 161 passes through the opposite through hole to emit light toward the light guide plate 14. The light source member 161 is an LED lamp, but it is not limited thereto.

As shown in FIG. 18, the step of assembling the backlight assembly 1 may include: after locking the back plate 11 and the first transitional frame 12 by the first back lock member 4, flipping the back plate 11 and the first transitional frame 12 which have been connected together so that the top side of the back plate 11 is placed upward; installing the light source 16, the reflective sheet 13, the light guide plate 14 and the backlight film 15 in this order on the top side of the back plate 11. In this way, during the above-mentioned assembling process, the back plate 11 and the first transitional frame 12 have been locked by the first back lock member 4, so that there is no need for auxiliary jigs to limit positions when the back plate 11 and the first transitional frame 12 are flipped, thereby facilitating flipping the back plate 11 and the first transitional frame 12 quickly. Moreover, since the first transitional frame 12 is located on the back side of the back plate 11, it will not affect installing the light source 16, the reflective sheet 13, the light guide plate 14 and the backlight film 15 in sequence, so as to further improve the assembling efficiency.

Further, as shown in FIG. 3 and FIG. 10, the backlight assembly 1 further includes the second transitional frame 17, and the second transitional frame 17 includes the second limiting portion 171 extending to the top side of the edge of the backlight film 15. The second limiting portion 171 may limit the movement of the backlight film 15 in the thickness direction of the backlight module 100, thereby facilitating the pre-limiting of the backlight film 15.

As shown in FIG. 18, the step of assembling the backlight assembly 1 further includes: after installing the backlight film 15, placing the second transitional frame 17 on the edge of the back plate 11 and positioning the second limiting portion 171 above the backlight film 15, thereby facilitating the pre-limiting of the backlight film 15. In this way, it is convenient to install the assembled display screen assembly 102 on the top side of the backlight assembly 1, thereby avoiding a misalignment of the backlight film 15, which may otherwise affect the display of the display device 200. Next, the top lock member 19 passes through the second transitional frame 17 and the back plate 11 in sequence from the second side of the back plate 11 to lock the second transitional frame 17 and the back plate 11, without flipping the back plate 11 again, thereby facilitating the assembly. There may be one or more top lock members 19. When there are a plurality of top lock members 19, the plurality of top lock members 19 may be disposed at intervals in a length direction of the second transitional frame 17.

Further, the method further includes: after locking the second transitional frame 17 and the back plate 11 by the top lock member 19, locking the outer frame 2 and the first second transitional frame 17 by the second sideward lock member 18 from the radial outer side of the backlight module 100. For example, in the examples of FIG. 11 and FIG. 18, after the second transitional frame 17 and the back plate 11 are locked by the top lock member 19, the assembled display module 102 may be disposed on the top side of the assembled backlight module 1, and then the outer frame 2 and the first transitional frame 12 are locked by the first sideward lock member 3 from the radial outer side of the backlight module 100, and the outer frame 2 and the second transitional frame 17 are locked by the second sideward lock member 18 from the radial outer side of the backlight module 100. In this way, the display screen assembly 102 and the backlight assembly 1 are firmly connected.

Figure 5:
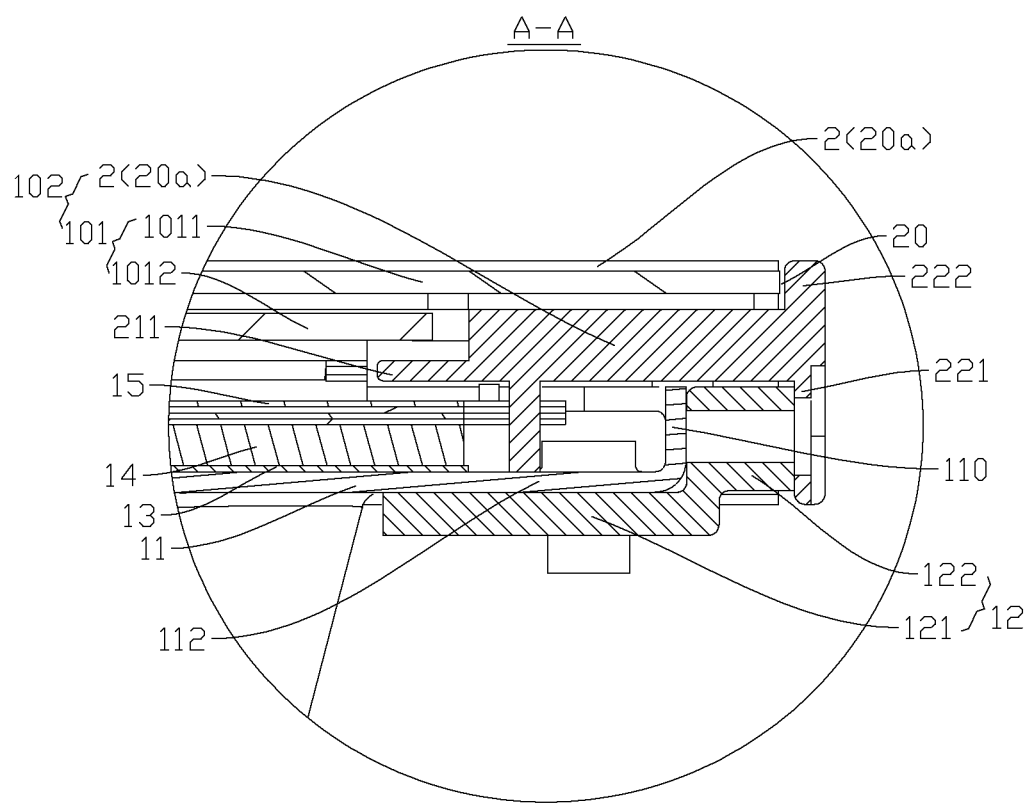
FIG. 5 is another partial cross-sectional view taken along line A-A in FIG. 2.

In some embodiments of the present disclosure, as shown in FIG. 5 and FIG. 18, the step of assembling the display screen assembly 102 includes: placing the top side of the outer frame 2 upward; and adhering the display screen 101 onto the top side of the outer frame 2. As a result, the operation of adhering the display screen 101 onto the outer frame 2 may be completed separately, so that it is convenient to control and repair appearance defects in time, thereby improving the yield rate.

For example, adhesive may be affixed on the top side of the outer frame 2 to adhere the display screen 101 onto the outer frame 2 so that the display screen 101 and the outer frame 2 are adhesively connected, thereby simplifying and facilitating the assembling process of the display screen assembly 102. It can be understood that, after the display screen 101 is adhered onto the outer frame 2, in order to ensure an adhesive reliability between the display screen 101 and the outer frame 2, the display screen 101 may be pressed, for example, for 10 minutes. The pressing process may be carried out separately without wasting the production time.

In some embodiments of the present disclosure, the method further includes: after the outer frame 2 and the first transitional frame 12 are locked by the first sideward lock member 3 so that the backlight assembly 1 and the display screen assembly 102 are fixedly connected, flipping the backlight assembly 1 and the display screen assembly 102 so that the display screen assembly 102 is located on the lower side and the backlight assembly 1 is located on the upper side; and using the second back lock member 5 to pass through the first transitional frame 12 and the outer frame 2 in sequence from the first side of the back plate 11 so as to lock the first transitional frame 12 and the outer frame 2. In this way, the firm connection between the first transitional frame 12 and the outer frame 2 are further improved, thereby improving the structural stability of the display device 200 and ensuring a use reliability of the display device 200.

The backlight module 100, the display device 200 and the method for assembling the display device 200 according to the embodiments of the present disclosure will be described in detail below by means of describing two specific exemplary embodiments with reference to FIGS. 1 to 18. It is to be understood that the following descriptions are merely exemplary illustrations, rather than specific limitations to the present disclosure.

As shown in FIGS. 1 to 15 and FIG. 18, the display device 200 includes a display screen 101 and a backlight module 100. The backlight module 100 includes a backlight assembly 1 and an outer frame 2. The outer frame 2 is disposed on the top side of the backlight assembly 1, and the outer frame 2 is fixedly connected with the backlight assembly 1. The display screen 101 is installed on the outer frame 2, and the display screen 101 is adhered onto the outer frame 2. The display screen 101 is a capacitive touch screen, such as a full-lamination electronically controlled touch screen. The display screen 101 includes a touch glass 1011 and a liquid crystal glass 1012. The liquid crystal glass 1012 is adhered to a back side of the touch glass 1011, and the touch glass 1011 is adhered to the outer frame 2. A plane on which the display screen 101 is located may be perpendicular to the thickness direction of the backlight module 100.

The backlight module 100 further includes a first sideward lock member 3 and a first back lock member 4. The backlight assembly 1 includes a back plate 11, a first transitional frame 12, a second transitional frame 17, a second sideward lock member 18, and a top lock member 19. The edge of the back plate 11 includes four sub-edges 112 which are connected end-to-end to form a quadrangular shape, and each sub-edge 112 extends in a straight line. The second transitional frame 17 is disposed at a front sub-edge 112, the second transitional frame 17 is located on the top side of the back plate 11, and the second transitional frame 17 is fixedly connected with the back plate 11. The first transitional frames 12 are disposed at a rear sub-edge 112, a left sub-edge 112 and right sub-edge 112, respectively. The first transitional frame 12 is located on the back side of the back plate 11, and the first transitional frame 12 and the back plate 11 are fixedly connected. The first sideward lock member 3 is inserted inward from the outer side of the backlight module 100 to pass through the outer frame 2 and the first transitional frame 12 so as to lock the outer frame 2 and the first transitional frame 12. The first transitional frame 12 and the back plate 11 are locked by the first back lock member 4 from the back side of the backlight module 100. The outer frame 2 and the second transitional frame 17 are locked by the second sideward lock member 18 from the outer side of the backlight module 100. The second transitional frame 17 and the back plate 11 are locked by the top lock member 19 from the top side of the backlight module 100. For example, the back plate 11 is a metal piece.

The outer frame 2 includes the first outer frame 20a and the second outer frame 20b. The second outer frame 20b is provided at the front sub-edge 112 so as to be disposed correspondingly to the second transitional frame 17. The first outer frames 20a are disposed at the back, left and right sub-edges 112, respectively, so as to be disposed correspondingly to the first transitional frames 12, respectively. Two adjacent first outer frames 20a are fixedly connected by a first top lock fastener. The first top lock fastener fastens two adjacent first outer frames 20a from the top side of the backlight module 100. The first outer frame 20a and the second outer frame 20b which are adjacent to each other are fixedly connected by a second top lock fastener. The second top lock fastener fastens the first outer frame 20a and the second outer frame 20b which are adjacent to each other from the top side of the backlight module 100. The first sideward lock member 3 locks the first outer frame 20a and the first transitional frame 12 from the outer side of the backlight module 100, and the second sideward lock member 18 locks the second outer frame 20b and the second transitional frame 17 from the outer side of the backlight module 100. The edge of the display screen 101 is adhered to both the first outer frame 20a and the second outer frame 20b.

The first outer frame 20a includes the first surface frame 21 and the first side frame 22 located on the outer side of the first surface frame 21. The first side frame 22 is connected with the first surface frame 21. The first transitional frame 12 includes a second surface frame 121 and a second side frame 122 located on the outer side of the second surface frame 121. The second side frame 122 is connected with the second surface frame 121. The second side frame 122 extends from the outer edge of the second surface frame 121 toward the top side of the backlight module 100, so that the second side frame 122 and the second surface frame 121 collectively define the bearing groove 120 that is open on the top side and the inner side. The edge of the back plate 11 is mounted in the bearing groove 120. The first surface frame 21 and the second surface frame 121 are oppositely disposed in the thickness direction (for example, the up-down direction in FIGS. 2 and 3) of the backlight module 100. The edge of the back plate 11 are located between the second surface frame 121 and the first surface frame 21. The first back lock member 4 passes through the second surface frame 121 and the edge of the back plate 11 in sequence, to lock the first transitional frame 12 and the back plate 11. The first side frame 22 includes the first extension 221 surrounding the second side frame 122. The first extension 221 extends toward the back side of the backlight module 100. The first sideward lock member 3 passes sequentially through the first extension 221 and the second side frame 122 to lock the first extension 221 and the second side frame 122.

The second outer frame 20b includes a first surface frame 21 and a first side frame 22 located on the outer side of the first surface frame 21. The first side frame 22 is connected with the first surface frame 21. The second transitional frame 17 includes a first connection portion 172 located on the inner side of the flanged portion 110 and a second connection portion 173 extending to the outer side of the flanged portion 110. A cross-sectional of the first connection portion 172 is generally U-shaped. The first connection portion 172 is connected with the second connection portion 173, and the second connection portion 173 surrounding the flange portion 110, so that the flange portion 110 is fitted with the first connection portion 172 and the second connection portion 173. The first connection portion 172 and the second connection portion 173 are opposite to the first surface frame 21 in the thickness direction (for example, the up-down direction in FIG. 2 and FIG. 3) of the backlight module 100. The top lock member 19 passes through the first connection portion 172 and the edge of the back plate 11 in sequence, to lock the second transitional frame 17 and the back plate 11. The first side frame 22 includes a third extension 223 surrounding the second connection portion 173. The third extension 223 extends toward the back side of the backlight module 100. The second sideward lock member 18 passes sequentially through the third extension 223 and the second connection portion 173 to lock the third extension 223 and the second connection portion 173.

The first side frame 22 of the first outer frame 20a and the first side frame 22 of the second outer frame 20b each include the second extension 222 extending toward the top side of the backlight module 100. The second extension 222 and the first surface frame 21 collectively define the receiving space 20 that is open on its top side. The edge of the display screen 101 is positionally fitted in the receiving space 20.

As shown in FIGS. 3 and 6-9, the backlight assembly 1 further includes a reflective sheet 13, a light guide plate 14, a backlight film 15 and a light source 16. The reflective sheet 13, the light guide plate 14, the backlight film 15 and the light source 16 are all located on the top side of the back plate 11, the light guide plate 14 is located on the top side of the reflective sheet 13, and the backlight film 15 is located on the top side of the light guide plate 14. A positioning protrusion 111 is formed on the top side of the edge of the back plate 11. A positioning hole 150 is formed in the backlight film 15, and the positioning hole 150 is positionally fitted with the positioning protrusion 111. A flange portion 110 is formed at the edge of the back plate 11, and the flange portion 110 extends from the edge of the back plate 11 toward the top side of the backlight module 100. The edge of the reflective sheet 13, the edge of the light guide plate 14, and the edge of the backlight film 15 are all located inside the flange portion 110. The edge of the reflective sheet 13, the edge of the light guide plate 14, and the edge of the backlight film 15 are all located in the bearing groove 120. The backlight film 15 may include a four-layer film structure. For example, the backlight film 15 may include a diffusion sheet, a prism sheet, and a light enhancement sheet.

As shown in FIG. 4, FIG. 5, FIG. 10, and FIG. 11, the first surface frame 21 includes a first limiting portion 211 extending to the top side of the edge of the backlight film 15, and the first limiting portion 211 is located on the inner side of the first surface frame 21 and the first limiting portion 211 may extend inward from the inner edge of the first surface frame 21. The first limiting portion 211 may restrict the movement of the backlight film 15 in the thickness direction of the backlight module 100. The second transitional frame 17 includes a second limiting portion 171 extending to the top side of the edge of the backlight film 15. The second limiting portion 171 is located on the inner side of the first connection portion 172 and the second limiting portion 171 extends inward from the inner edge of the first connection portion 172. The second limiting portion 171 may restrict the movement of the backlight film 15 in the thickness direction of the backlight module 100. As shown in FIG. 4 and FIG. 5, the lower surface of the first surface frame 21 may have a supporting portion extending toward the back side of the backlight module 100 in the thickness direction of the backlight module 100, and a lower end of the supporting portion may rely against the back plate 11, thereby ensuring that the outer frame 2 is stably placed on the backlight assembly 1, facilitating improving the structural stability of the outer frame 2, and ensuring the structural stability of the display device 100.

In the display device 200 according to the embodiments of the present disclosure, the outer frame 2 may be used not only as a product outer frame, but also as a frame of the backlight module 100, so that the outer frame 2 may be used as a top housing of the whole device when the display device 200 is applied to various cases. In this way, the structure of the display device is simple and easy to implement, and it is possible to realize an ultra-narrow frame design and have good assembly reliability.

As shown in FIG. 18, For example, the method for assembling the display device 200 may be performed according to the following steps.

At first, the backlight assembly 1 and the display screen assembly 102 are separately assembled. The display screen assembly 102 includes the display screen 101 and the outer frame 2. The step of assembling the backlight assembly 1 may include: placing the back side of the back plate 11 upward; placing the first transitional frame 12 on the back plate 11, for example, fitting positionally the first transitional frame 12 with a positioning post on the back side of the back plate 11 to avoid a misalignment of the first transitional frame 12; locking the second surface frame 121 and the corresponding sub-edge 112 of the back plate 11 by the first back lock member 4 from the back side of the back plate 11; flipping the back plate 11 and the first transitional frame 12 which have been connected together so as to place the top side of the back plate 11 upward; installing the light source 16, the reflective sheet 13, the light guide plate 14 and the backlight film 15 in sequence on the top side of the back plate 11; placing the second transitional frame 17 on the front sub-edge 112 of the back plate 11 and placing the second limiting portion 171 on the top side of the backlight film 15; and locking the first connection portion 172 and the corresponding sub-edge of the back plate 11 by the top lock member 19. The step of assembling the display screen assembly 102 includes: connecting and splicing the first outer frame 20a and the second outer frame 20b to form a complete outer frame 2 so that the outer frame 2 is formed into a square ring structure as a whole; placing the front side of the outer frame 2 upward; and adhering the display screen 101 to the receiving space 20 of the outer frame 2.

Next, the assembled display screen assembly 102 is disposed on the top side of the assembled backlight assembly 1. Finally, the first sideward lock member 3 is used to lock the outer frame 2 and the first transitional frame 12 from the outer side of the backlight module 100, and the second sideward lock 18 is used to lock the outer frame 2 and the second transitional frame 17 from the outer side of the backlight module 100. At this point, product assembly is complete, so that the product may be inspected, packaged and shipped.

The step of assembling the display screen assembly 102 is separately performed, and may be completed offline, so that the fit between the display screen 101 and the outer frame 2 is easily adjusted, thereby improving the product yield.

In the method for assembling the display device 200 according to the embodiments of the present disclosure, no auxiliary jigs are needed during the whole production process, the number of flipping is reduced, the operation steps are saved, and the production efficiency is improved. Moreover, defects of the product appearance such as flash seam and mismatch are easily controlled and adjusted, and may be repaired in time. In this way, the normal production process is not affected and the production time is saved.

Further, as shown in FIG. 16, a structure in this embodiment is substantially identical to that in the above embodiments, except that the backlight module 100 in this embodiment further includes a second back lock member 5, the second back lock member 5 locking the second side frame 122 and the first surface frame 21 from the back side of the backlight module 100. It should be noted that the same components are denoted by the same reference numerals.

The method for assembling the display device 200 further includes: after locking the outer frame 2 and the first transitional frame 12 by the first sideward lock member 3, flipping the backlight assembly 1 and the display screen assembly 102, and locking the first transitional frame 12 and the outer frame 2 by the second back lock member 5 from the back side of the backlight module 100.

Figure 19:
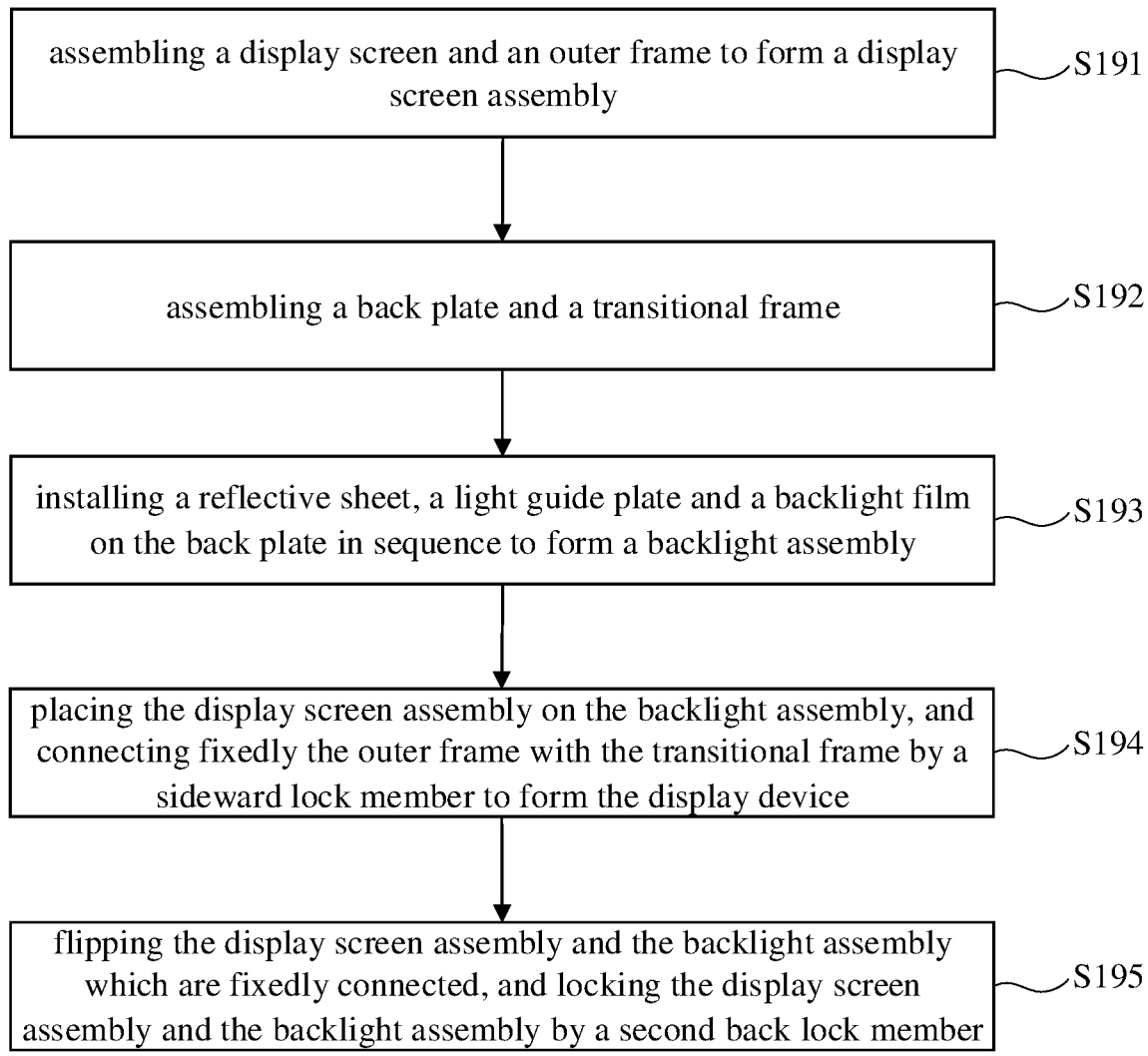
FIG. 19 is a flowchart of a method for assembling a display device according to some exemplary embodiments of the present disclosure.

FIG. 19 is a flowchart of a method for assembling a display device according to some embodiments of the present disclosure. With reference to FIGS. 3 to 16 and FIG. 19, a method for assembling a display device according to some embodiments of the present disclosure may be performed in the following steps.

In step S191, the display screen 101 and the outer frame 2 are assembled to form the display screen assembly 102. For example, an adhesive may be adhered on the top surface of the first surface frame 21, the display screen 101 is placed in the receiving space 20, and the display screen 101 is adhered to the first surface frame 21 of the outer frame 2.

In step S192, the back plate 11 and the transitional frames 12, 17 are assembled.

Specifically, the top lock screw 190 passes through the fourth through hole 172a of the second transitional frame 17, and the top lock screw 190 is screwed into the fourth threaded connection hole 11a of the back plate 11 to fixedly connect the second transitional frame 17 and the back plate 11, referring to FIG. 11. The back plate 11 may be flipped so that the back surface of the back plate 11 faces upward, so as to facilitate an insertion of the first back lock screw 40. At this time, the first back lock screw 40 passes through the second through hole 121a of the first transitional frame 12, and the first back lock screw 40 is screwed into the second threaded connection hole 113a of the back plate 11 to fixedly connect the first transitional frame 12 and the back plate 11, as shown in FIG. 10.

It should be noted that the above steps S191 and S192 may be performed separately and in parallel, so that it is conducive to saving production time and improving production efficiency. In addition, the adhering step in step S191 may be completed separately, so that it is beneficial for adjusting or repairing poor adhesion during the adhering process, and such adjustment and repair will not affect the production process of the entire production line of the display device, thereby facilitating improving the product yield.

In step S193, the light source 16 (for example, an LED lamp board), the reflective sheet 13, the light guide plate 14, and the backlight film 15 are sequentially mounted on the back plate 11 to form the backlight assembly 1.

As described above, the edge of the reflective sheet 13, the edge of the light guide plate 14, and the edge of the backlight film 15 are all located on the inner side of the flange portion 110 of the back plate 11, and the edge of the reflective sheet 13, the edge of the light guide plate 14, and the edge of the backlight film 15 are all located in the bearing groove 120 of the back plate 11. The positioning protrusion 111 is formed on the top side of the edge of the back plate 11, the positioning hole 150 is formed in the backlight film 15, the positioning groove 140 is formed in the light guide plate 14, and the positioning groove 140 and the positioning hole 150 are positionally fitted with the positioning protrusion 111.

In step S194, the display screen assembly 102 assembled in the above step S191 is placed on the backlight assembly 1 assembled in the above step S193, and the display screen assembly 102 and the backlight assembly 1 are fixedly connected by the sideward lock members.

For example, the sideward lock screw 30 passes through the first through hole 221a of the first transitional frame 12 in the direction perpendicular to the thickness of the backlight module 100, and the sideward lock screw 30 is screwed into the first threaded connection hole 122a of the outer frame 2.

In the above method, the flipping needs to be performed only one time, that is, the back plate 11 is flipped to insert the first back lock screw 40 in step S192, and the number of flipping is reduced. Moreover, in the flipping step in step S192, only the back plate 11 or the back plate 11 fixedly connected with the second transitional frame 17 needs to be flipped. Therefore, in this flipping step, no auxiliary jigs are needed for fixed connection, thereby saving the operation steps and improving the production efficiency.

Optionally, in step S195, the display screen assembly 102 and the backlight assembly 1 which are fixedly connected are flipped, and the display screen assembly 102 and the backlight assembly 1 are locked by the second back lock member.

For example, the second back lock member is a second back lock screw 50, the second back lock screw 50 passes through the second side frame 122 in the thickness direction of the backlight module 100, and the second back lock screw 50 is screwed into the first surface frame 21 to lock the display screen assembly 102 and the backlight assembly 1.

Similarly, in the flipping process in step S195, the display screen assembly 102 and the backlight assembly 1 that have been fixedly connected are flipped. Therefore, in this flipping process, no auxiliary jigs are required for fixed connection, thereby saving the operation steps and improving the production efficiency.

In the descriptions of the present disclosure, it should be understood that directions or positional relations indicated by terms such as "center", "length", "thickness", "up", "down", "front", "rear", "left", "right", "inner", or "outer" are based on directions or positional relations shown in the drawings, and are only for the convenience of describing the present disclosure and simplifying the descriptions, rather than indicating or implying that the devices or elements which are indicated by these terms must have particular orientations, be configured and operated in particular orientations, thus these terms cannot be understood as a limitation on the present disclosure.

In addition, terms such as "first" and "second" are used for descriptive purposes only, and cannot be understood as indicating or implying relative importance or implicitly indicating the number of technical features. Therefore, the features defined by "first" or "second" may explicitly or implicitly include one or more of the features.

In the present disclosure, unless otherwise specified and defined, terms such as "install", "connect", "connected" or "fix" should be understood broadly, for example, they may indicate a fixed connection, a detachable connection, or an integrated piece; or may indicate a mechanical, electrical or communication connection; or may indicate a direct connection or an indirect connection through an intermediate medium; or may indicate an internal connection between two elements or an interaction between two elements. For those skilled in the art, specific meanings of the above terms in the present disclosure may be understood according to specific situations.

In the present disclosure, unless otherwise specified and defined, an expression that a first feature is located "above" or "below" a second feature may mean that the first feature is in direct contact with the second feature, or the first feature is in indirect contact with the second feature through an intermediate medium. Moreover, an expression that a first feature is located "on", "above", or "on upper side of" a second feature may mean that the first feature is directly above or obliquely above the second feature, or may only mean that the first feature is higher in level than the second feature. An expression that a first feature is located "below", "under", or "on lower side of" a second feature may mean that the first feature is directly below or obliquely below the second feature, or may only mean that the first feature is lower in level than the second feature.

In the descriptions of the present specification, the descriptions of reference terms such as "some embodiments", "example", "specific examples", or "some examples" and the like may mean that specific features, structures, materials, or characteristics described in conjunction with the embodiments or examples are included in at least some embodiments or examples of the present disclosure. In the present specification, schematic expressions of the above terms are not necessarily directed to the same embodiment or example. Moreover, the described specific features, structures, materials, or characteristics may be combined in any suitable manner in any one or more embodiments or examples. In addition, without any contradiction, those skilled in the art may incorporate and combine different embodiments or examples described in the present specification with features in the different embodiments or examples.

Although the embodiments of the present disclosure have been shown and described, those skilled in the art can understand that various changes, modifications, replacements and variations may be made to these embodiments without departing from the principle and spirit of the present disclosure. Thus, the scope of the present disclosure shall be defined by appending claims and their equivalents.

What is claimed is:

1. A backlight module, wherein the backlight module comprises:
a backlight assembly comprising a back plate and a first transitional frame, wherein the back plate is fixedly connected with the first transitional frame, a light guide plate is provided on the back plate, the light guide plate and the first transitional frame are respectively located on opposite sides of the back plate in a thickness direction of the backlight module; and
an outer frame, wherein the outer frame and the light guide plate are provided on the same side of the back plate in the thickness direction of the backlight module, and the outer frame is fixedly connected with the first transitional frame so that the outer frame is fixedly connected with the back plate through the first transitional frame,
wherein the outer frame comprises a first surface frame located above the back plate and a first side frame located at a side of the first surface frame and surrounding the back plate; and the first transitional frame comprises a second surface frame and a second side frame located at a side of the second surface frame, the first side frame comprises a first extension extending toward the back plate and surrounding the second side frame, and the first extension is connected with the second side frame,
wherein the second side frame extends from an outer edge of the second surface frame toward the outer frame, so that the second side frame and the second surface frame collectively define a bearing groove having an accommodation space; the back plate comprises an edge portion and a flange portion provided on an edge of the edge portion and extending toward the first surface frame, and both the edge portion and the flange portion are installed in the bearing groove, and a protrusion for positioning is formed on the edge portion, the protrusion is fixedly connected with the back plate and is spaced apart from the flange portion, and a backlight film is disposed on the back plate, the backlight film comprises a positioning hole that is positionally fitted with the protrusion, and the light guide plate comprises a positioning groove that is positionally fitted with the protrusion.

2. The backlight module according to claim 1, further comprising a first sideward lock member, wherein the first extension and the second side frame are fixedly connected by the first sideward lock member.

3. The backlight module according to claim 2, wherein the first sideward lock member is a sideward lock screw, a first through hole is formed in the first extension, a first threaded connection hole is formed in the second side frame, and the sideward lock screw passes through the first through hole and is screwed into the first threaded connection hole.

4. The backlight module according to claim 1, further comprising a first back lock member, wherein the second surface frame and the edge portion are fixedly connected by the first back lock member.

5. The backlight module according to claim 4, wherein the first back lock member is a first back lock screw, a second through hole is formed in the second surface frame, a second threaded connection hole is formed in the edge portion, and the first back lock screw passes through the second through hole and is screwed into the second threaded connection hole.

6. The backlight module according to claim 1, wherein the first surface frame comprises a first limiting portion extending away from the first side frame and extending above the back plate; and a backlight film is disposed on the back plate, and an edge of the backlight film is sandwiched between the first limiting portion and the back plate.

7. The backlight module according to claim 6, wherein the backlight assembly further comprises:

a second transitional frame, the second transitional frame and the outer frame are located on the same side of the back plate in the thickness direction of the backlight module.

8. The backlight module according to claim 7, wherein the backlight assembly comprises three first transitional frames and one second transitional frame, the back plate comprises four flange portions surrounding the edge portion, the second transitional frame is disposed correspondingly to one of the flange portions, and the first transitional frames are disposed correspondingly to the other three flange portions, respectively.

9. The backlight module according to claim 8, wherein the second transitional frame comprises a first connection portion, a second connection portion and a second limiting portion, both the first connection portion and the second limiting portion are located on an inner side of the corresponding flange portion, the second limiting portion extends above the backlight film, and the second connection portion is located on an outer side of the corresponding flange portion.

10. The backlight module according to claim 9, wherein the backlight assembly further comprises a second sideward lock member, wherein, the first side frame comprises a third extension extending toward the back plate and surrounding the second connection portion, a third through hole is formed in the third extension, a third threaded connection hole is formed in the second connection portion, and the second sideward lock member passes through the third through hole and is screwed into the third threaded connection hole.

11. The backlight module according to claim 10, wherein the backlight assembly further comprises a top lock member, and the top lock member locks the first connection portion and the back plate from a top side of the second transitional frame; and the top lock member is a top lock screw, a fourth through hole is formed in the first connection portion, a fourth threaded connection hole is formed in the back plate, and the top lock screw passes through the fourth through hole and is screwed into the fourth threaded connection hole.

12. The backlight module according to claim 5, wherein the backlight assembly further comprises:

a second back lock member, the second side frame and the first surface frame are fixedly connected by the second back lock member.

13. The backlight module according to claim 12, wherein the second back lock member is a second back lock screw, a fifth through hole is formed in the second side frame, a fifth threaded connection hole is formed in the first surface frame, and the second back lock screw passes through the fifth through hole and is screwed into the fifth threaded connection hole.

14. A display device comprising:

a display screen; and the backlight module according to claim 1, wherein, the outer frame comprises a first surface frame located above the back plate and a first side frame located at a side of the first surface frame and surrounding the back plate, and the display screen is installed on the first surface frame of the outer frame.

15. The display device according to claim 14, wherein the outer frame further comprises a second extension extending toward the display screen, and the display screen is received in a receiving space which is defined collectively by the first surface frame and the second extension.

16. A method for manufacturing a display device, comprising:

assembling a display screen and an outer frame to form a display screen assembly;

assembling a back plate and a transitional frame;

installing a reflective sheet, a light guide plate and a backlight film on the back plate in sequence to form a backlight assembly; and placing the display screen assembly on the backlight assembly, and connecting fixedly the outer frame with the transitional frame by a sideward lock member to form the display device, wherein, the transitional frame comprises a first transitional frame, the light guide plate and the first transitional frame are respectively located on opposite sides of the back plate in a thickness direction of the display device, and the light guide plate and the outer frame are located on the same side of the back plate in the thickness direction of the display device;

the assembling the back plate and the transitional frame comprises: connecting fixedly the first transitional frame with the back plate by a first back lock member; and the connecting fixedly the outer frame with the transitional frame by the sideward lock member comprises:

locking the outer frame with the first transitional frame by a first sideward lock member from a radial outer side of the backlight assembly, wherein the transitional frame further comprises a second transitional frame, and the second transitional frame and the outer frame are located on the same side of the back plate in the thickness direction of the display device;

the assembling the back plate and the transitional frame further comprises; connecting fixedly the second transitional frame with the back plate by a top lock member; and the connecting fixedly the out frame with the transitional frame by the sideward lock member further comprises; locking the outer frame with the second transitional frame by a second sideward lock member from the radial outer side of the backlight assembly.

\* \* \* \* \*